(12) United States Patent
Kuwajima et al.

(10) Patent No.: US 6,614,625 B1
(45) Date of Patent: Sep. 2, 2003

(54) MAGNETIC DISK APPARATUS

(75) Inventors: Hideki Kuwajima, Kyoto (JP); Kenichi Sakamoto, Osaka (JP); Kaoru Matsuoka, Osaka (JP); Yoshihiro Ueno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/442,188

(22) Filed: Nov. 16, 1999

(30) Foreign Application Priority Data

Nov. 17, 1998 (JP) .......................................... 10-327328
May 10, 1999 (JP) .......................................... 11-129325

(51) Int. Cl.$^7$ ................................................ G11B 5/54
(52) U.S. Cl. .................. 360/254.7; 360/255; 360/244.2
(58) Field of Search .......................... 360/254.3, 254.6, 360/254.7, 255, 255.2, 255.5, 255.6, 255.9, 246.1, 244.2

(56) References Cited

U.S. PATENT DOCUMENTS

| | | | | | |
|---|---|---|---|---|---|
| 4,017,898 A | * | 4/1977 | Toombs et al. | .............. | 360/254 |
| 4,684,913 A | * | 8/1987 | Yaeger | ........................ | 337/140 |
| 5,808,837 A | * | 9/1998 | Norton | ..................... | 360/254.3 |

* cited by examiner

Primary Examiner—Robert S. Tupper
(74) Attorney, Agent, or Firm—RatnerPrestia

(57) ABSTRACT

A magnetic disk apparatus includes a slider for holding a magnetic head for scanning a magnetic disk and performing recording end reproduction of information; a flexure member for holding the slider, the flexure member having an elasticity in a direction substantially perpendicular to a surface of the magnetic disk; a head actuator arm for holding the flexure member and causing the magnetic head to scan the magnetic disk; and an elastic body provided on the head actuator arm for applying a load for pressing the slider toward the surface of the magnetic disk.

18 Claims, 21 Drawing Sheets

FA > FB

FA < FB

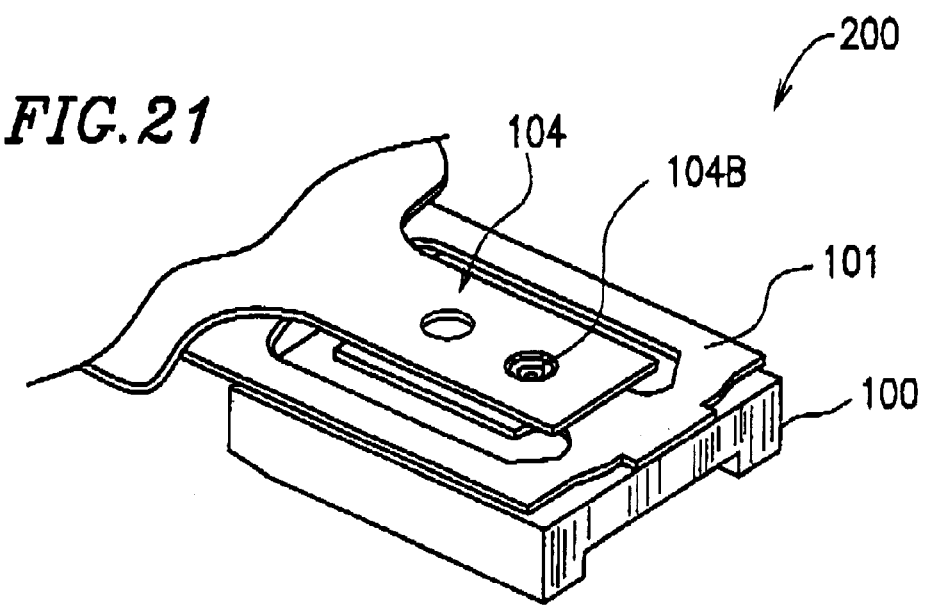
FIG. 21
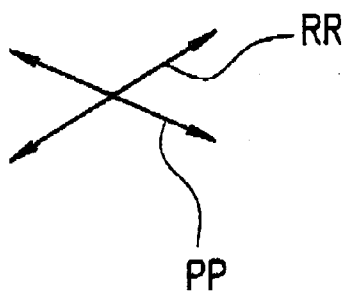
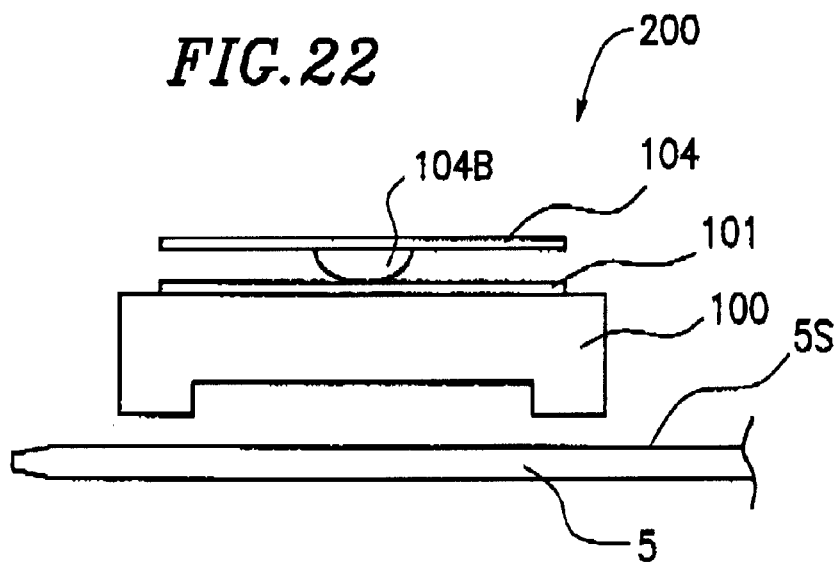
FIG. 22

MAGNETIC DISK APPARATUS

BACKGROUND OF THE INVENTION

1. Field of the Invention

The prevent invention relates to a magnetic disk apparatus usable for, for example, a memory device in a computer.

2. Description of the Related Art

Magnetic disk apparatuses generally use a non-contact magnetic head in order to avoid damaging a magnetic disk acting as a recording medium. Usually, a magnetic head mounted on a floating slider is used. The slider is attached to, for example, a flexible flexure member, which in attached to a load beam provided on a head actuator arm.

While the magnetic disk apparatus is in an operation mode, the slider floats above the magnetic disk at a microscopic floating distance by the balance between the pressing force of the load beam for biasing the slider onto a surface of the magnetic disk and the floating force caused by the air flow which in generated by the rotation of the magnetic disk. In such a magnetic disk apparatus, a contact start stop (CSS) system is used, according to which the magnetic disk apparatus starts and stops while the magnetic disk and the magnetic head are in contact with each other. In this specification, the term "floating distance" is defined as the vertical distance between the slider floating above the magnetic disk and the surface of the magnetic disk.

According to the CSS system, the magnetic head is always in a wait state while being in contact with a surface of the magnetic disk when the magnetic disk apparatus to in a stop mode, i.e., is not operated. When the magnetic disk apparatus is started, the magnetic disk rotates, and the magnetic head is lifted up from the surface of the magnetic disk by the air flow generated by the rotation of the magnetic disk. Then, the magnetic head is driven to access an appropriate location of the magnetic disk, and thus information is recorded on or reproduced from the magnetic disk. When the magnetic disk apparatus is stopped, the magnetic head arrives on the surface of the magnetic disk and held in contact with the surface of the magnetic disk.

The CSS system has a problem in that since the magnetic head is lifted up from and arrives on the surface of the magnetic disk, the magnetic head and the magnetic disk may undesirably be damaged by the impact of contact between the magnetic head and the magnetic disk.

The CSS system has another problem in that after the magnetic head and the magnetic disk are in contact with each other for an extended period of time, the magnetic head and the magnetic disk are adsorbed to each other end cannot be separated from each other even when the magnetic disk apparatus is started.

Japanese Laid-Open Publication No. 60-38773 proposes that the magnetic head is out of contact with the magnetic disk while the magnetic disk apparatus is in a atop mode, so that the magnetic head and the magnetic disk are prevented from being adsorbed to each other.

FIG. 20 is an isometric view illustrating a structure of a slider holding section 200 for holding a slider 100 of a conventional magnetic disk apparatus. As shown in FIG. 20, the slider 100 provided with a magnetic head mounted thereon is secured by adhesion on a bottom surface of a flexible flexure member 101. The flexure member 101 is secured to a bottom surface of a load beam 104.

The load beam 104 is provided for applying a prescribed pressing load generated in a leaf spring section 104A of the load beam 104 to the slider 100. The load beam 104 is secured to a tip of a head actuator arm 102 via a base plate 103. The head actuator arm 102 is rotated about a support an a base substrate (not shown).

FIG. 21 shows an enlarged isometric view of the load beam 104, the flexure member 101 and the slider 100 of the slider holding section 200.

As shown in FIG. 21, the pressing load is applied to the slider 100 by the load beam 104 through a projection 104B of the load beam 104. The flexure member 101 is maintained flexible in rolling directions RR and in Ditch directions PP. In this specification, the term "rolling direction" is defined to refer to the direction perpendicular to the longitudinal direction of the head actuator arm.

An shown above, the flexure member 101 for holding the slider 100 is attached to the load beam 104.

FIG. 22 is a cross-sectional view of FIG. 21, illustrating the load beam 104, the flexure member 101, and the slider 100 of the slider holding section 200.

In the above-described conventional slider holding section 200 of the conventional magnetic disk apparatus, a separation arm (not shown) raises the load beam 100 by a contact friction so as to float the slider 100 which is attached to the tip of the load beam 104 via the flexure member 101. During this operation, the parallel relationship between the slider 100 and a magnetic disk 5 can undesirably be destroyed due to, for example, the frictional force between the separation arm and the load beam 104 and the dispersion in the position of the load beam 104 acted on by the separation arm. The reason is that the flexure member 101 for holding the slider 100 is attached to the load beam 104.

In the case where the above-mentioned parallel relationship is destroyed, the slider 100 undesirably contacts a surface 5S (FIGS. 5A and 5B) of the magnetic disk 5 to cause friction when the slider 100 is lifted up from the surface 5S.

During the magnetic disk apparatus is in an operation mode, the load beam 104 resonates due to the vibration of the magnetic disk apparatus caused by an external disturbance. Since the flexure member 101 is attached to the load beam 104, the flexure member 101 vibrates integrally with the load beam 104. As a result, the slider 100 attached to the flexure member 101 undesirably contacts the magnetic disk 5.

As described above, when the conventional magnetic disk apparatus is started or stopped, it is difficult to maintain the slider and the magnetic, disk substantially parallel to each other and to maintain the floating distance. Accordingly, the slider and the magnetic disk are damaged, resulting in that information is prevented from correctly recorded on or reproduced from the magnetic disk.

SUMMARY OF THE INVENTION

According to one aspect of the invention, a magnetic disk apparatus includes a slider for holding a magnetic head for scanning a magnetic disk and performing recording and reproduction of information; a flexure member for holding the slider, the flexure member having an elasticity in a direction substantially perpendicular to a surface of the magnetic disks a head actuator arm for holding the flexure member and causing the magnetic head to scan the magnetic disk; and an elastic body provided on the head actuator arm for applying a load for pressing the slider toward the surface of the magnetic disk.

In one embodiment of the invention, the elastic body includes a leaf spring, and the leaf spring has a cantilever structure.

In one embodiment of the invention, the magnetic disk apparatus further includes unloading means for releasing the slider from the load.

In one embodiment of the invention, the unloading means releases the slider from the load when the slider is positioned above an outermost track of the magnetic disk.

In one embodiment of the invention, the unloading means includes a ramp slidably contactable with the elastic body so as to raise the elastic body from the flexure member.

In one embodiment of the invention, the elastic body includes an engaging section slidably contactable with the ramp.

In one embodiment of the invention, the unloading means includes a shape-memory alloy member provided on the elastic body for banding the elastic body so am to release the slider from the load.

In one embodiment of the invention, the unloading means includes a thin film piezoelectric member provided on the elastic body for banding the elastic body so as to release the slider tram the load.

In one embodiment of the invention, the unloading means includes an unloading arm secured to the head actuator arm; and a ramp slidably contactable with the uploading arm so as to allow the unloading arm to release the slider from the load. The unloading arm releases the slider from the load so as to allow the slider top be maintained substantially parallel to the surface of the magnetic disk.

In one embodiment of the invention, the unloading arm is engageable with the elastic body so as to release the slider from the load.

In one embodiment of the invention, the unloading arm has one end secured to the head actuator arm, another end slidably contactable with the ramp in an area including an unloading position and the vicinity thereof, and a central portion engageable with the elastic body so as to release the slider from the load.

In one embodiment of the invention, the ramp includes a guide having an inclined surface which is slidably contactable with the unloading arm, and the inclined surface is inclined toward a central portion of the magnetic disk.

In one embodiment of the invention, the unloading arm includes a leaf spring, and the leaf spring has a cantilever structure.

In one embodiment of the invention, the ramp is located so as to avoid overlapping the surface of the magnetic disk.

In one embodiment of the invention, the unloading arm la substantially parallel to a longitudinal direction of the head actuator arm.

In one embodiment of the invention, the unloading arm is located on a side of the elastic body opposite from the magnetic disk.

In one embodiment of the invention, the elastic body has an engaging section which is engageable with the unloading are so as to release the slider from the load.

In one embodiment of the invention, the elastic body is provided with a protrusion for pressing the flexure member with the load.

In one embodiment of the invention, the flexure member is provided with a protrusion for receiving the load.

According to another aspect of the invention, a magnetic disk apparatus includes a slider for holding a magnetic head for scanning a magnetic disk end performing recording and reproduction of information; a flexure member for holding the slider, the flexure member having an elasticity in a direction substantially perpendicular to a surface of the magnetic disk; a head actuator arm for holding the flexure member and causing the magnetic head to scan the magnetic disk; a motor for rotating the magnetic disk; and a controller for controlling a rotation speed of the motor. The slider has a recess in a surface thereof facing the surface of the magnetic disk. The recess is provided in a manner that a first air pressure generated by the rotation of the disk in a direction to cause the slider to approach the surface of the magnetic disk is larger than a second air pressure generated in a direction to cause the slider to be distanced from the surface of the magnetic disk. The controller increases the rotation speed of the motor to a level higher than a proscribed rotation speed and then decreases the rotation speed to the prescribed rotation speed.

Thus, the invention described herein makes possible the advantages of providing a magnetic disk apparatus for maintaining a slider and a magnetic disk substantially parallel with an appropriate floating distance therebetween so as to prevent damaging the slider and the magnetic disk, so that information la correctly recorded on or reproduced from the magnetic disk.

These and other advantages of the present invention will become apparent to those skilled in the art upon reading and understanding the following detailed description with reference to the accompanying figures.

BRIEF DESCRIPTION OF THE DRAWINGS

FIG. 21 is an enlarged isometric view of a load beam, a flexure member, and a slider of the slider holding section shown in FIG. 20; and FIG. 22 is a cross-sectional view of FIG. 21.

DESCRIPTION OF THE PREFERRED EMBODIMENTS

Hereinafter, the present invention will be described by way of illustrative examples with reference to the accompanying drawings.

EXAMPLE 1

Figure 1:
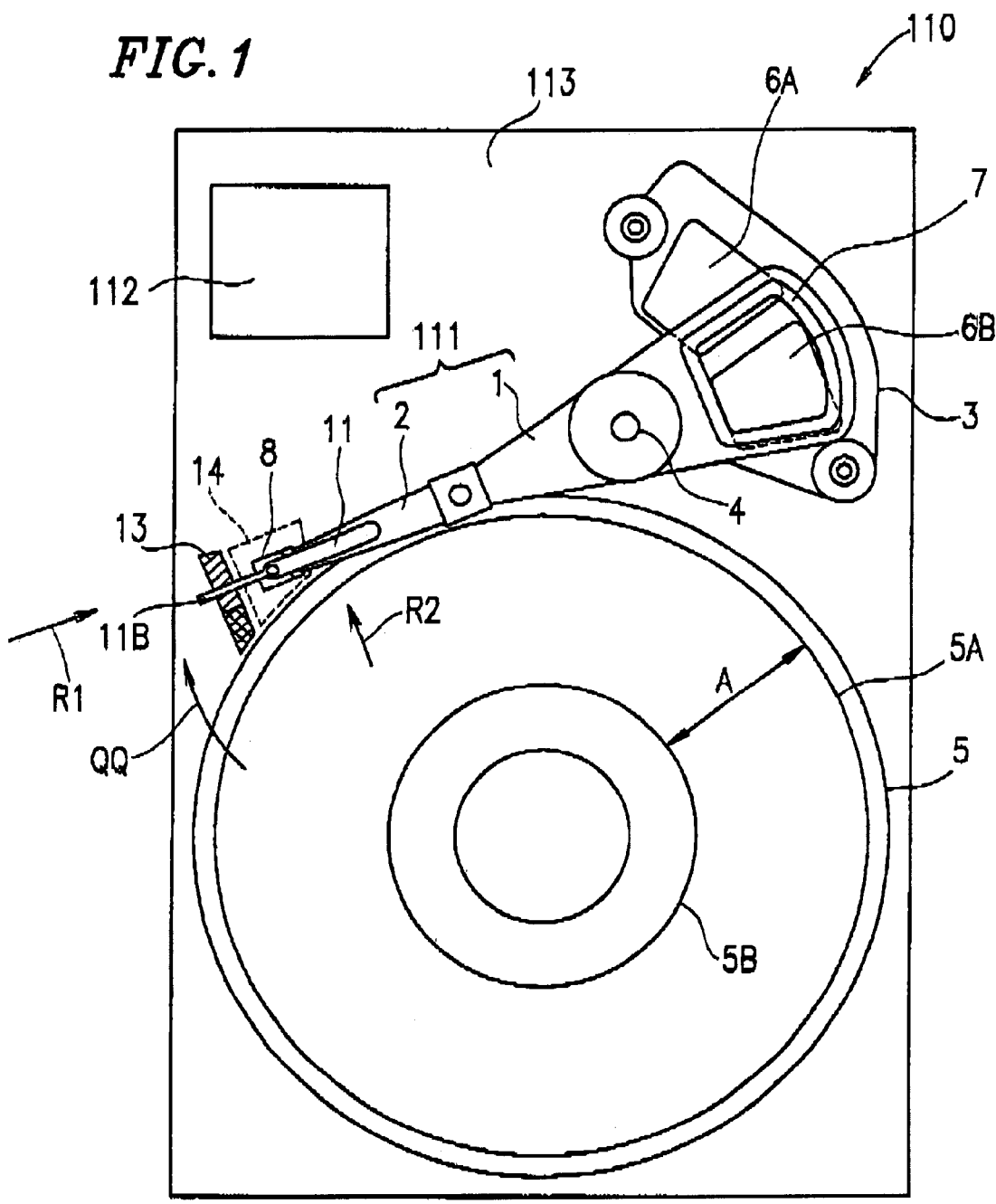
FIG. 1 is a plan view of a magnetic disk apparatus in a first example according to the present invention, illustrating the state where the magnetic disk apparatus in a stop mode.

FIG. 1 is a plan view of a magnetic disk apparatus 110 in a first example according to the present invention. The magnetic disk apparatus 110 includes a head actuator arm 111. In FIG. 1, the head actuator arm 111 is looked in a wait state.

Figure 2:
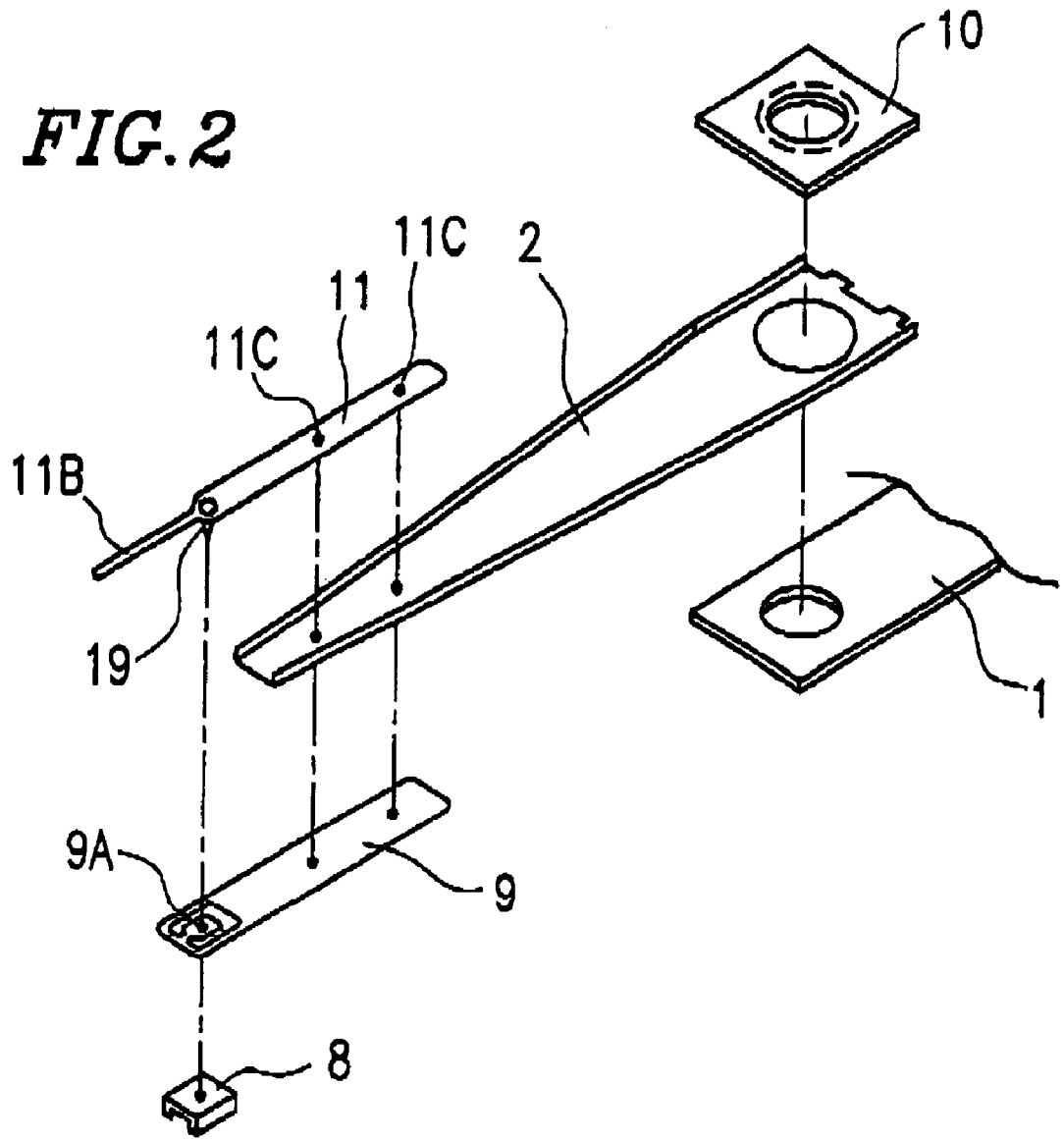
FIG. 2 is an exploded isometric view of a flexure member supporting arm and components attached thereto of the magnetic disk apparatus shown in FIG. 1.

The head actuator arm 111 includes an arm 1 and a flexure member supporting arm 2 for supporting a flexure member 9 (FIG. 2). The flexure member 9 holds a slider 8 (FIG. 2). The slider 8 holds a magnetic head (not shown) for scanning a magnetic disk 5 to record or reproduce information. A voice coil motor 3, which is attached to the arm 1, includes magnets 6A and 6B and a coil 7.

The head actuator arm 111 pivots about a pivoting shaft 4 by the voice coil motor 3. When the head actuator arm 111 pivots, the magnetic head held by the slider 8 records information on or reproduce information from a data area A between an outermost track 5A one an innermost track 5B of the magnetic disk 5.

A plurality of magnetic disks 5 are put in a stacked manner and integrally rotated at a prescribed speed by a spindle motor (not shown). The rotation speed of the spindle motor is controlled by a magnetic disk control section 112.

FIG. 2 is an exploded isometric view of the flexure member supporting arm 2 and components attached thereto. The flexure member supporting arm 2 is coupled with the arm 1 via a base plate 10. The flexure member 9 is attached to a tip of a bottom surface of the flexure member supporting arm 2, and the slider 8 having a magnetic head (not shown) mounted thereon is secured to the flexure member 9 by adhesion or the like.

Figure 3A:
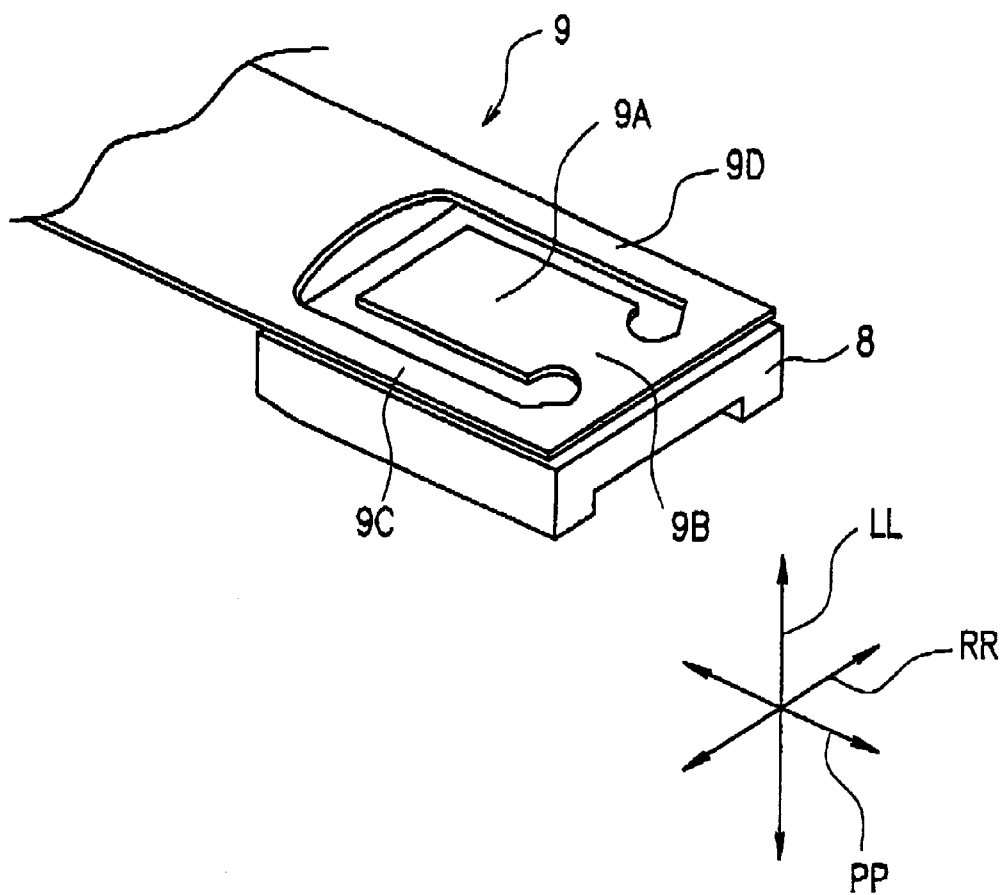
FIG. 3A is an enlarged isometric view of a slider and a flexure member of the magnetic disk apparatus shown in FIG. 1.
Figure 3B:
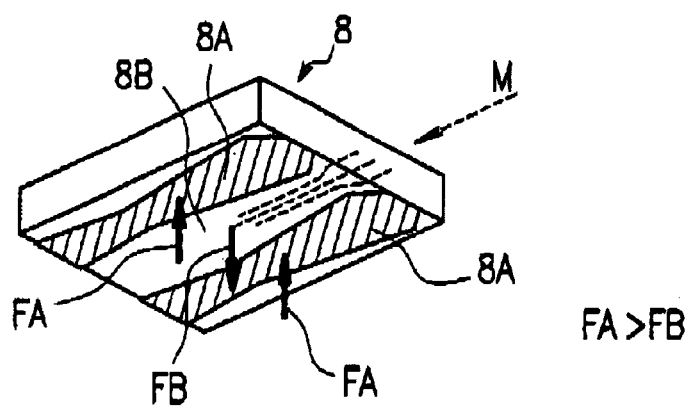
FIG. 3B is an enlarged isometric view of the slider shown in FIG. 3A.

FIG. 3A to an enlarged isometric view of the flexure member 9 and the slider 8. FIG. 3B is an enlarged isometric view of the slider 8, illustrating an air bearing surface of the slider 8 which faces the surface of the magnetic disk 5 (FIG. 1).

Referring to FIG. 3A, the slider 8 is secured to a bottom surface of a slider attaching section 9A by adhesion or the like. The flexure member 9 has flexible sections 9B, 9C and 9D. Accordingly, while the slider 8 is floating above the magnetic disk 5 (FIG. 1), the slider 8 is flexible in the rolling directions RR and in the pitch directions PP, and is highly rigid in lateral directions LL.

Referring to FIG. 3B, the slider 8 has projections 8A and a recess 8B. The projections 8A projects relative to the recess 8B by a height difference in the order of several micrometers. The surface of the recess 8B acts as an air bearing surface. When the slider 8 runs over the surface as (FIGS. 5A and 5B) of the magnetic disk 5, the air flows on the air bearing surface in the direction of arrow M.

A positive pressure FA acts on the projections 8A in a direction to separate the slider 8 from the magnetic disk 5 (FIG. 1). A negative pressure FB acts on the recess 8B in the opposite direction. The projections 8A and the recess 8B are formed so that the positive pressure FA is larger than the negative pressure FB (FA>FB).

Returning to FIG. 2, a load beam 11 is attached to a tip of an upper surface of the flexure member supporting arm 2. The load beam 11 is an elastic body for applying a load so as to prone the slider 8 toward the magnetic disk 5 (FIG. 1). The load beam 11 has a cantilever structure, by which the load beam 11 is secured to the flexure member supporting arm 2 at attaching locations 11C.

A protrusion 19 is provided on the load beam 11 for applying a load to the slider 8. The protrusion 19 applies the load to a prescribed point of the slider 8 via the slider attaching section 9A.

As shown in FIG. 1, a ramp 13 is provided on a base substrate 113 in the vicinity of the magnetic disk 5 as unloading means for releasing the slider 8 from the load when the magnetic disk apparatus 110 goes into the stop mode, so that the slider 8 is in a wait state outside the magnetic disk 5 while the magnetic disk apparatus 110 is in the stop mode. The load boom 11 has an engaging section 11B to be raised by the ramp 13 so that the load of the load beam 11 is prevented from acting on the slider 8.

The load beam 11 can be formed of, for example, a leaf spring. A leaf spring is especially desirable since it makes the formation of the engaging section 113 relatively easy.

Figure 4:
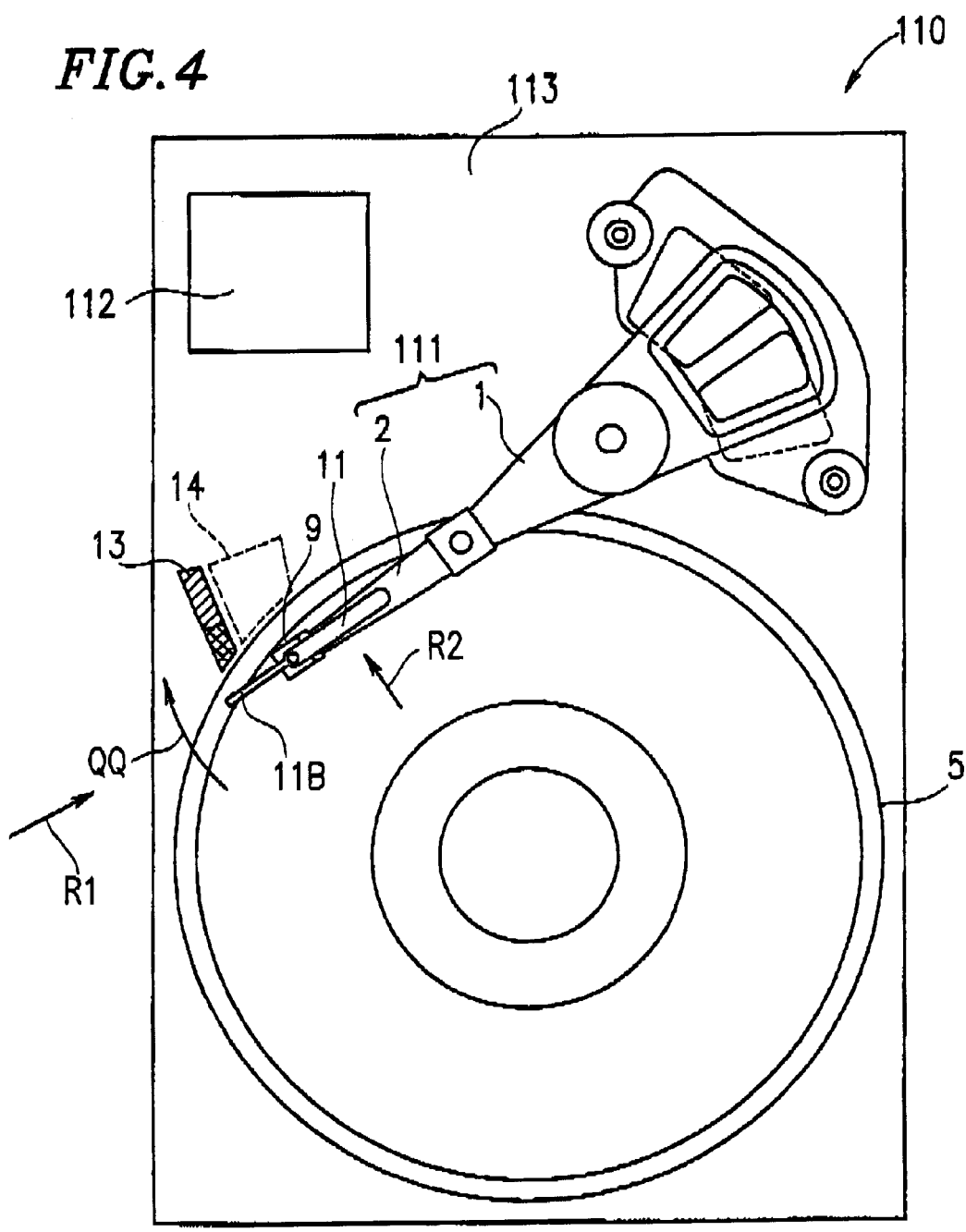
FIG. 4 is a plan view of a magnetic disk apparatus shown in FIG. 1, illustrating the state where the magnetic disk apparatus is in an operation mode.
Figure 5A:
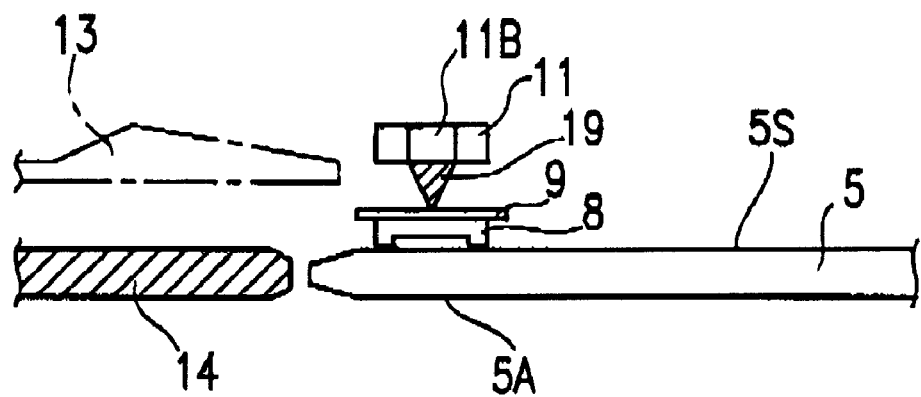
FIG. 5A is a side view of a head actuator arm of the magnetic disk apparatus shown in FIG. 4 seen in the direction of arrow R1 in FIG. 4, illustrating the state where the head actuator arm is above a magnetic disk.
Figure 5B:
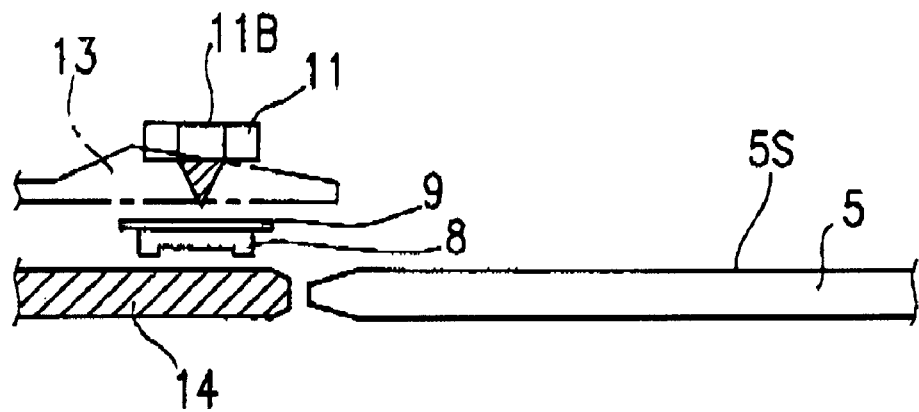
FIG. 5B in a side view of the head actuator arm of the magnetic disk apparatus shown in FIG. 1 seen in the direction of arrow R1 in FIG. 1, illustrating the state where the head actuator arm is outside the magnetic disk.

With reference to FIGS. 4, 5A, 5B, 6A and 6B, an exemplary operation of the magnetic disk apparatus 110 will be described. FIG. 4 is a plan view of the magnetic disk apparatus 110 before the head actuator arm 111 goes into a wait state. FIGS. 5A and 5E are partial side views of the head actuator arm 111 seen in the direction of arrow R1 (FIG. 4). In the state of FIG. 5A, the slider 8 is above the outermost track 5A of the magnetic disk 5 as in FIG. 4 in a manner that information recording and reproduction are possible. In the state of FIG. 5B, the slider 8 is in a wait state outside the magnetic disk 5.

So that the magnetic disk apparatus 110 goes into the stop mode from the state of FIGS. 4 and 5A, the rotation speed of the spindle motor is increased to a prescribed value by the magnetic disk control section 112. Then, the difference between the positive pressure FA and the negative pressure FB (FIG. 3B) acting on the slider 8 is increased by the air flow. As a result, the floating distance of the slider 8 above the magnetic disk 5 is increased.

Then, when the head actuator arm 111 pivots clockwise, i.e., in the direction of arrow QQ (FIG. 4). the engaging section 11B is raised by the ramp 13 as shown in FIG. 5B.

Figure 6A:
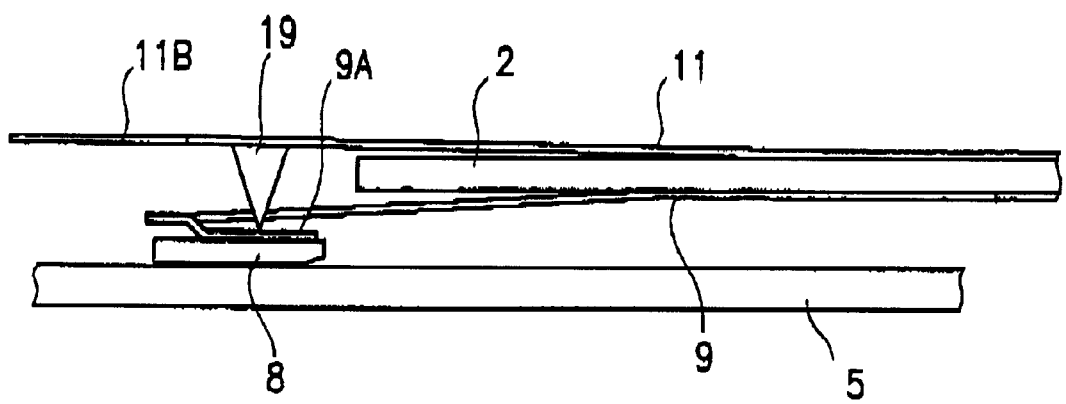
FIG. 6A is a side view of the head actuator arm of the magnetic disk apparatus shown in FIG. 4 seen in the direction of arrow R2 in FIG. 4, illustrating the state where the head actuator arm is above the magnetic disk.
Figure 6B:
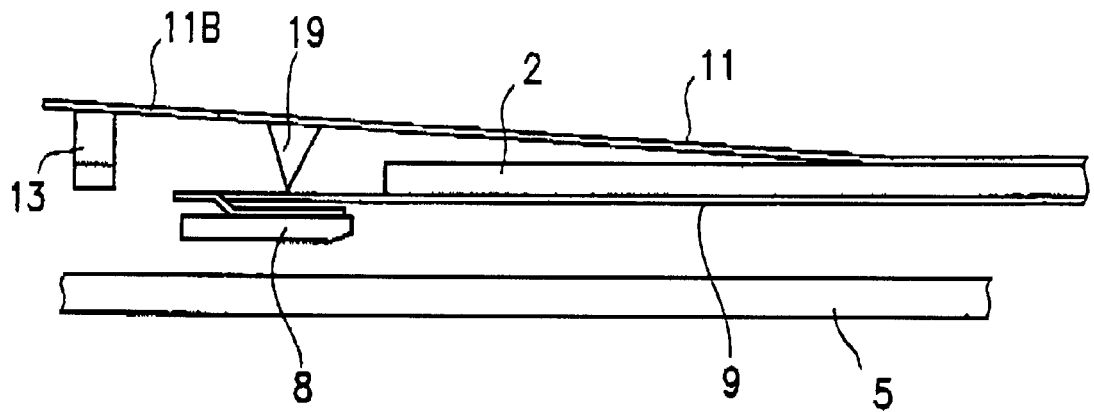
FIG. 6B is a side view of the head actuator am of the magnetic disk apparatus shown in FIG. 1 seen in the direction of arrow R2 in FIG. 1, illustrating the state where the head actuator are is away from the magnetic disk.

FIGS. 6A and 6B are partial side view of the head actuator arm 111 seen in the direction of arrow R2 (FIG. 4). FIG. 6A shows the same state as in FIG. 5A, and FIG. 6B shows the same state as in FIG. 5B.

As shown in FIG. 6A, the slider 8 is supplied with a prescribed load of, for example, about 1 gram to 2 grams by the protrusion 19 an the load beam 11 via the slider attaching section 9A of the flexure member 9. The slider 8 is maintained stable when the load and the pressure of the air flow generated by the rotation of the magnetic disk 5 are balanced.

In the state of FIG. 6A, the flexure member 9 is bent due to the load of the load beam 11. Accordingly, to be more strict, the slider 8 is maintained stable in the state where a value obtained by subtracting the load for bending the flexure member 9 from the load of the load beam 11 is balanced with the pressure of the air flow. The floating distance of the slider 8 above the magnetic disk 5 is, for example, about 50 nm.

When the magnetic disk apparatus 110 goes into the state shown in FIG. 5B (in which the engaging section 11B is raised by the ramp 13), the slider 8 is released from the load of the load beam 11 and lifted up from the magnetic disk 5 by a small recovery force of the flexure member 9 to return flexure member 9 to a horizontal state, as shown in FIG. 6B. Then, the head actuator arm 11 further pivots and thus locates the slider 8 outside the magnetic disk 5. Then, the magnetic disk apparatus 5 stops.

As shown in FIG. 5B, a slider receptor 14 is provided on the base substrate 119 so that the slider 8 does not significantly move even when the entirety of the magnetic disk apparatus 110 is exposed to a large impact in the state where the slider 8 is outside the magnetic disk 5.

As described above, while information recording on or reproduction from the magnetic disk 5 is performed, a prescribed load is applied to the flexure member 9; and while the magnetic disk apparatus 110 stops, the flexure member 9 is released from the load by the ramp 13 and the slider 8 is lifted up from the magnetic disk 5 by the elasticity of the flexure member 9. As described above, the ramp 13 releases the slider 8 above the outermost track 5A of the magnetic disk 5 from the load.

In the first example, the slider 8 is held by the flexure member supporting arm 2 via the flexure member 9, and the load beam 11 is also held by the flexure member supporting arm 2. Due to such a structure, even when the contact between the engaging section 11B and the ramp 13 causes a friction or even when the position of the engaging section 11B acted on by the ramp 13 is dispersed while the engaging section 11B in engagement with the load beam 11 is raised by the ramp 13, the slider 8 and the magnetic disk 5 are maintained parallel. As a result, the contact friction between the slider 8 and the magnetic disk 5 is prevented when the slider 8 is lifted up from the magnetic disk 5.

Since the flexure member 9 is held by the flexure member supporting arm 2, the flexure member 9 does not integrally vibrate with the load beam 11 even when the load beam 11 resonates by vibration of the magnetic disk apparatus caused by an external disturbance.

The tracking control characteristics of the magnetic head can be improved by setting the resonating frequency of the leaf spring used for the load beam 11 relatively high.

In this example, the load beam 11 formed of a leaf spring is used as an elastic body for applying a load for pressing the slider 8 toward the magnetic disk 5. The present invention is not limited to this. It in easily construed by those skilled in the art that the protrusion 19 may be formed of an elastic body formed of, for example, rubber.

In FIG. 2, the flexure member supporting arm 2 and the base plate 10 are separate. The flexure member supporting arm 2 and the bass plate 10 may be integral, in which case the production cost of the magnetic disk apparatus 110 is reduced.

EXAMPLE 2

A magnetic disk apparatus in a second example according to the present invention will be described. Identical elements previously discussed with respect to FIGS. 1 through 6B bear identical reference numerals and the descriptions thereof will be omitted.

Figure 7A:
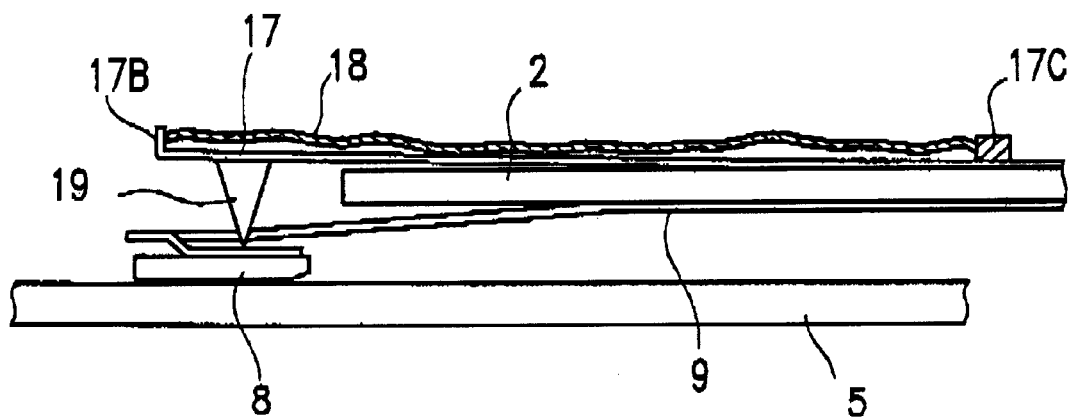
FIG. 7A is a side view of a head actuator arm of the magnetic disk apparatus in a second example according to the present invention, illustrating the state where the head actuator arm is above the magnetic disk.
Figure 7B:
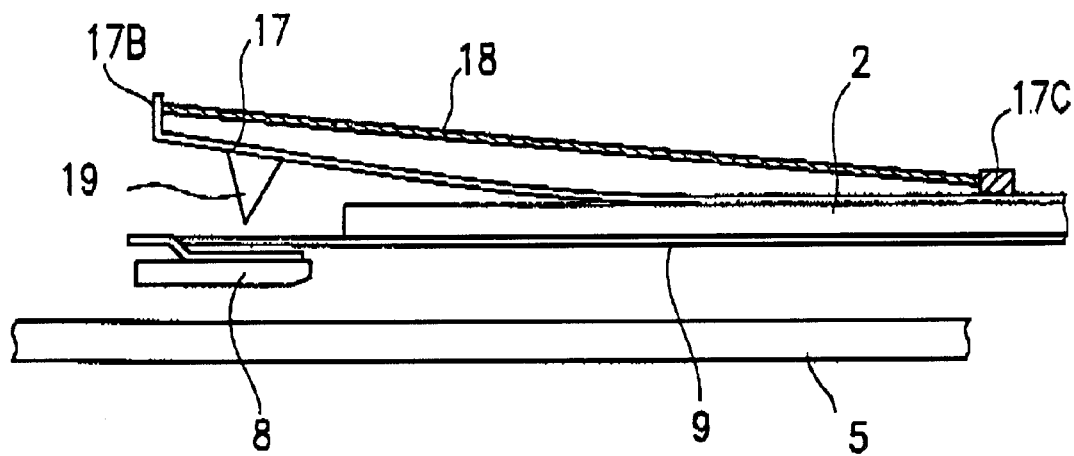
FIG. 7B is a side view of the head actuator arm of the magnetic disk apparatus in the second example according to the present invention, illustrating the state where the head actuator arm is away from the magnetic disk.

FIGS. 7A and 7B are partial side views of a head actuator arm seen in the direction of arrow R2 (FIG. 4). FIG. 7A mainly shows a load beam 17 and the slider 8 when the slider 8 is above the outermost track 5A of the magnetic disk 5 in a manner that information recording and reproduction are possible. FIG. 7B mainly shows the load beam 17 and the slider 8 when the slider 8 is away from the magnetic disk 5.

The second example is different from the first example in that a shape-memory alloy member is used as unloading means for releasing the slider 8 from the load in the second example.

As shown in FIG. 7A, the load beam 17 is provided on the flexure member supporting arm 2. Provided on the load beam 17 for releasing the slider 8 from the load is a wire 18 formed of a titanium-nickel-based alloy. The load beam 17 includes holding sections 17B and 17C for holding respective ends of the wire 18. When an electric current flows in the wire 18, heat is generated by an electric resistance. The heat shrinks the wire 18. The load beam 17 is insulated from the wire 18.

An exemplary operation of the magnetic disk apparatus in the second example having the above-described structure will be described.

As shown in FIG. 7A, the slider 8 floats above the magnetic disk 5 at a microscopic distance of, for example, about 50 nm, and the magnetic head mounted on the slider 8 records information on or reproduces information from the magnetic disk 5. When the magnetic disk apparatus is switched to stop mode, a prescribed amount of electric current flows in the wire 18, and the temperature of the wire 18 reaches over the temperature at which thermally elastic martensitic transformation occurs. As a result, the wire 18 shrinks so as to warp the load beam 17 as shown in FIG. 7B.

Since the flexure member 9 is elastic in a direction substantially perpendicular to the surface of the magnetic disk 5, the flexure member 9 returns to the horizontal state as shown in FIG. 7B. As a result, the floating distance of the slider 8 above the magnetic disk 5 is increased. The head actuator arm pivots to the same position as that of the head actuator arm 111 in FIG. 1.

In this manner, the wire 18 bends the load beam 17, and the load beam 17 releases the flexure member 9 from the load. When the flow of the electric current in the wire 18 is stopped, the slider 8 is pressed toward the slider receptor 14 (FIG. 1) by the biasing load of the load beam 17 and held in that state.

In the second example, the load beam 17 is bent by the electric current applied to the wire 18 formed of a titanium-nickel-based shape-memory alloy.

Accordingly, wherever the slider 8 is above the magnetic disk 5, the flexure member 9 can be released from the load applied by the load beam 17.

Since the ramp 13 can be eliminated, the magnetic disk apparatus can be reduced in size as compared to the apparatus 110 in the first example.

The floating distance of the slider 8 above the magnetic disk 5 can be adjusted by controlling the amount of the current supplied to the wire 18.

As in the first example, since the flexure member 9 is held by the flexure member supporting arm 2, the flexure member 9 does not integrally vibrate with the load beam 11 even when the load beam 17 resonates by vibration of the magnetic disk apparatus caused by an external disturbance.

EXAMPLE 3

A magnetic disk apparatus in a third example according to the present invention will be described. Identical elements previously discussed with respect to FIGS. 1 through 7B bear identical reference numerals and the descriptions thereof will be omitted.

Figure 8A:
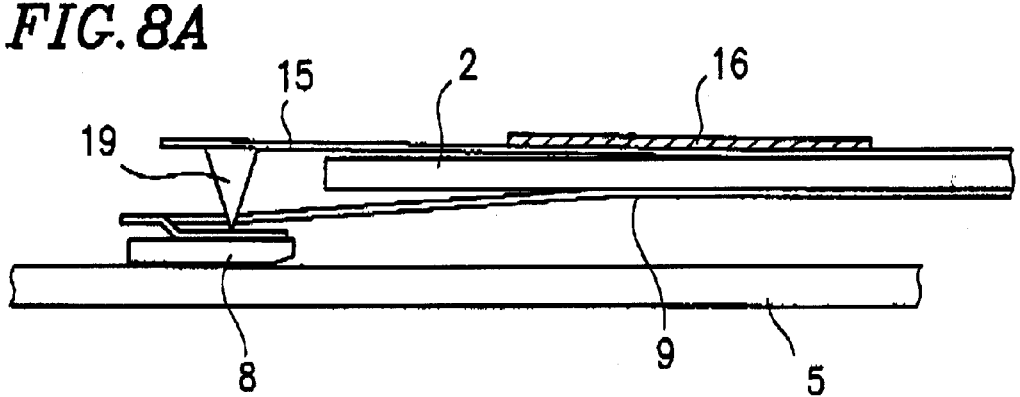
FIG. 8A is a aide view of a head actuator arm of the magnetic disk apparatus in a third example according to the present invention, illustrating the state where the head actuator am is above the magnetic disk.
Figure 8B:
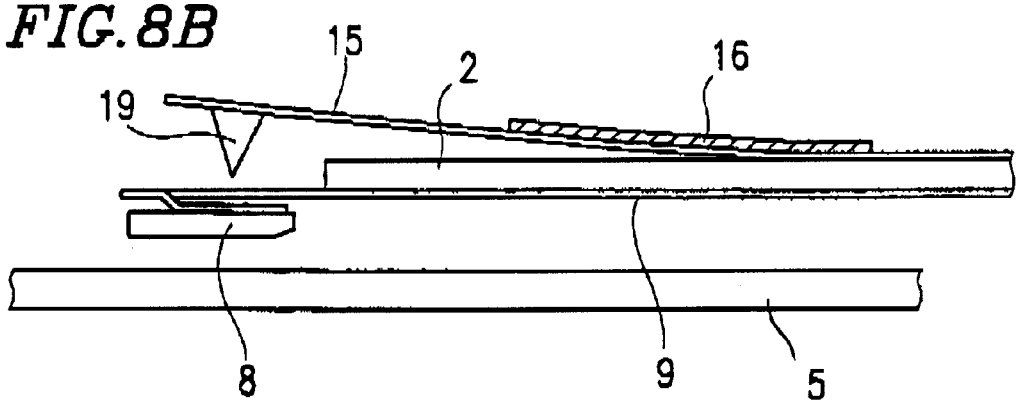
FIG. 8B is a side view of the head actuator arm of the magnetic disk apparatus in the third example according to the present invention, illustrating the state where the head actuator am is away from the magnetic disk.

FIGS. 8A and 8B are partial side views of a head actuator arm seen in the direction of arrow R2 (FIG. 4). FIG. 8A mainly shows a load beam 15 and the slider 8 when the slider 8 is above the outermost track 5A of the magnetic disk 5 in a manner that information recording and reproduction are possible. FIG. 8B mainly shows the load beam 15 and the slider 8 when the slider 8 is away from the magnetic disk 5.

The third example is different from the first example in that a thin film piezoelectric member is used as unloading means for releasing the slider 8 from the load in the third example.

As shown in FIG. 8A, a thin film piezoelectric member 16 is bonded to the load beam 15 which is provided on the flexure member supporting arm 2. The thin film piezoelectric member 16 and the load beam 15 together act as a bimetal.

An exemplary operation of the magnetic disk apparatus in the third example having the above-described structure will be described.

As shown in FIG. 8A, the slider 8 floats above the magnetic disk 5 at a microscopic distance of, for example, about 50 nm, and the magnetic head mounted on the slider 8 records information on or reproduces information from the magnetic disk 5. When the magnetic disk apparatus is switched to stop mode, a prescribed amount of electric current flows in the thin film piezoelectric member 16, and the thin film piezoelectric member 16 shrinks. As a result, the load beam 15 is warped as shown in FIG. 8B by a bimetal effect.

The flexure member 9 returns to the horizontal state as shown in FIG. 8B. As a result, the floating distance of the slider 8 above the magnetic disk 5 is increased. The head actuator arm pivots to the same position as that of the head actuator arm 111 in FIG. 1.

When the flow of the electric current in the thin film piezoelectric member 16 is stopped, the slider 8 is pressed to the slider receptor 14 (FIG. 1) by the biasing load of the load beam 15 and held in that state.

In the third example, the load beam 15 is bent by a voltage applied to the thin film piezoelectric member 16. Thus, the load beam 15 is bent in a smaller space than in the second example.

As in the second example, wherever the slider 8 is above the magnetic disk 5, the flexure member 9 can be released from the load applied by the load beam 15.

The floating distance of the slider 8 above the magnetic disk 5 can be adjusted by controlling the amount of the voltage applied to the thin film piezoelectric member 16.

Figure 9A:
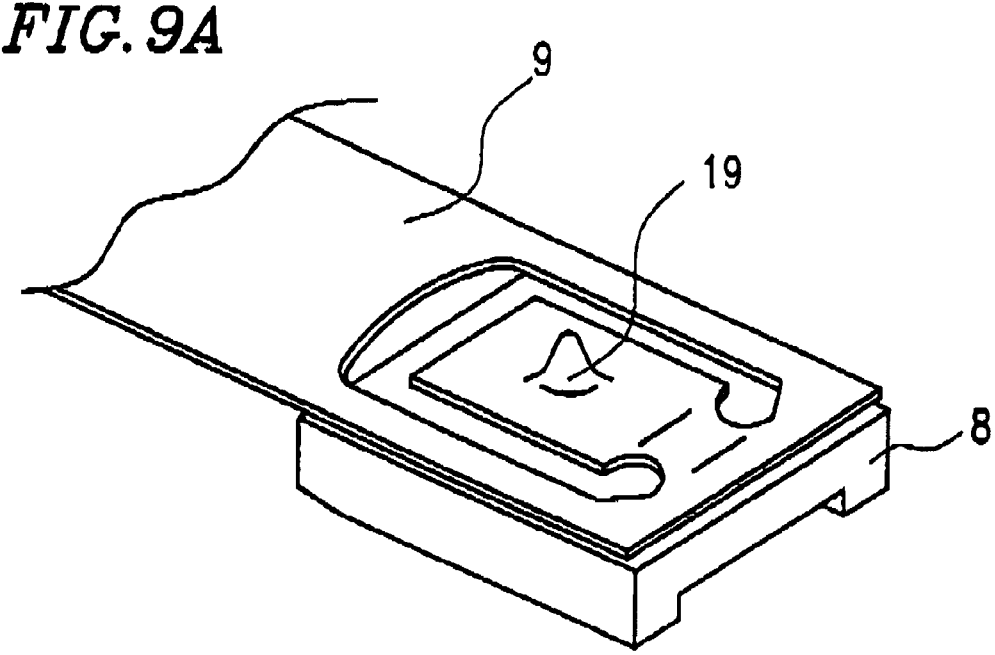
FIG. 9A is an enlarged isometric view of a slider and a flexure member of the magnetic disk apparatus in a modified example according to the present invention.
Figure 9B:
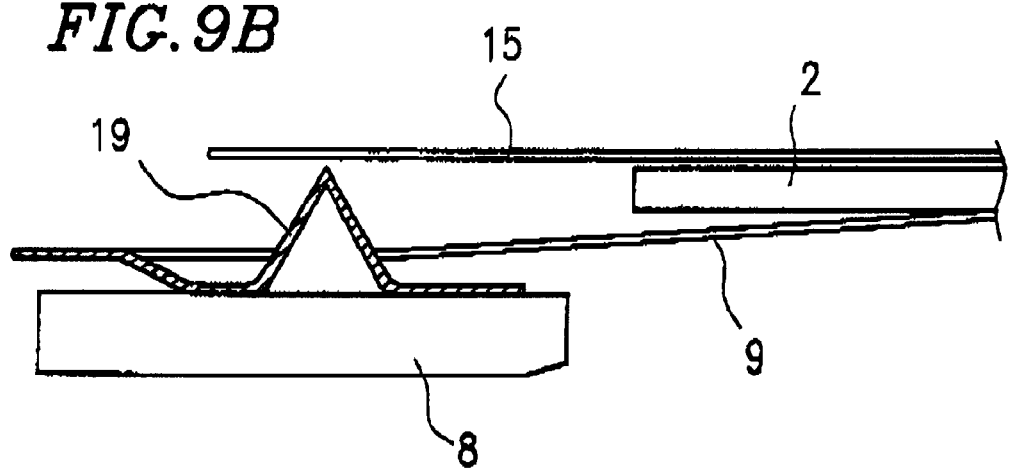
FIG. 9B is a cross-sectional view of the slider and the flexure member shown in FIG. 9A.

In the first, second and third examples, the protrusion 19 is provided on each of the load beams 11, 17 and 15. The present invention is not limited to this. The protrusion 19 can be provided on the flexure member 9 as shown in FIGS. 9A and 9B. In such a structure, even when the positions of the load beam (11, 17 or 15) and the flexure member 9 are offset relative to each other, the position of the slider 8 acted on by the load beam does not change.

In the third example, the thin film piezoelectric member 16 is provided on the load beam 15. Alternatively, the thin film piezoelectric member 16 can be provided on the flexure member 9.

EXAMPLE 4

Figure 10:
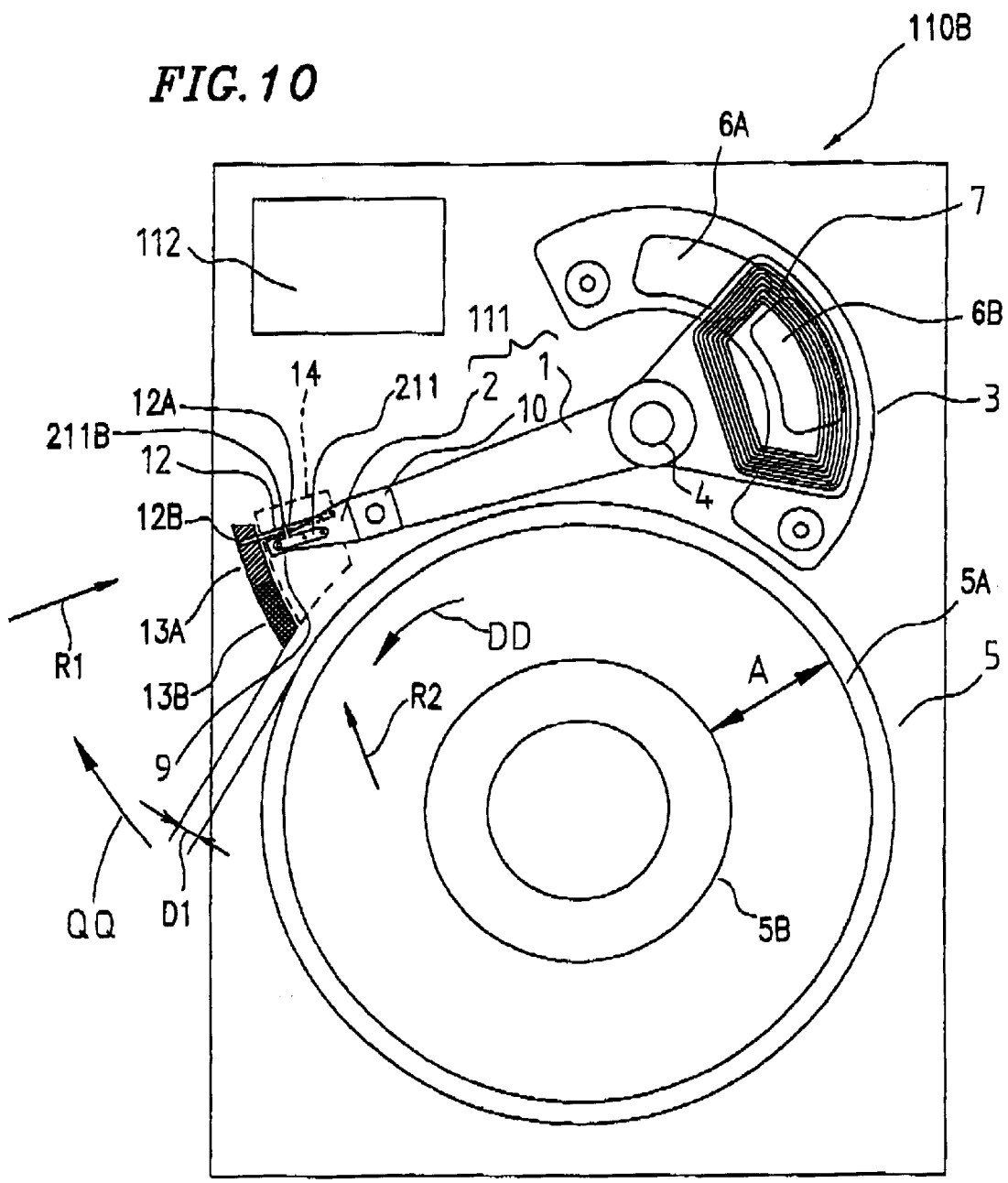
FIG. 10 is a plan view of a magnetic disk apparatus in a fourth example according to the present invention, illustrating the state where the magnetic disk apparatus is in a stop mode.

FIG. 10 is a plan view of a magnetic disk apparatus 110B in a fourth example according to the present invention. In FIG. 10, the head actuator arm 111 is locked in a wait state. Identical elements previously discussed with respect to FIGS. 1 through 10 bear identical reference numerals and the descriptions thereof will be omitted.

Figure 11:
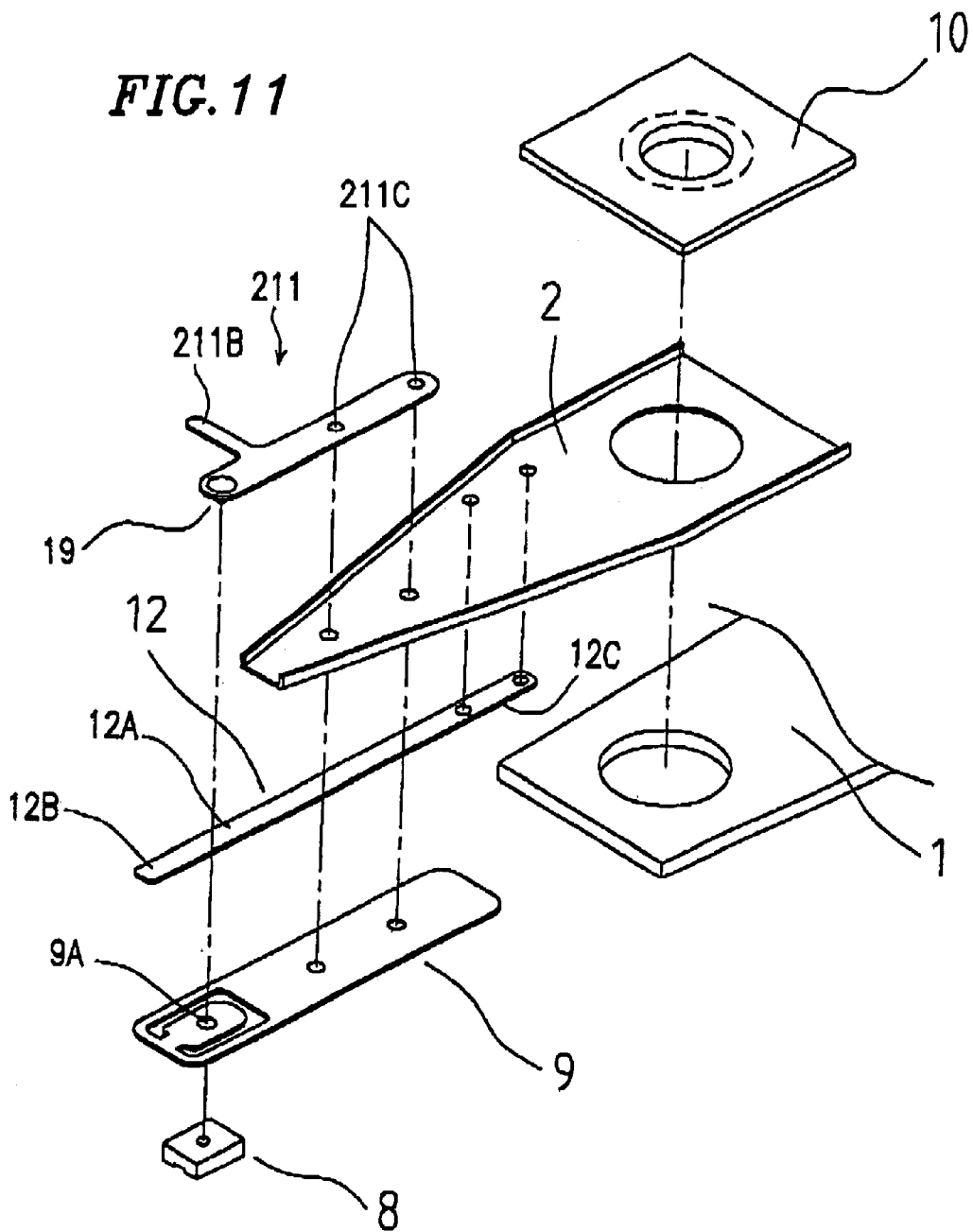
FIG. 11 is an exploded isometric view of a flexure member supporting arm end components attached thereto of the magnetic disk apparatus shown in FIG. 10.

FIG. 11 is an exploded isometric view of the flexure member supporting arm 2 of the magnetic disk apparatus 110B and components attached thereto.

The fourth example is different from the first example in that an unloading arm 12 is used as unloading means for releasing the slider 8 from the load in the fourth example. The unloading arm 12 is parallel to the longitudinal direction of the head actuator arm 111.

As shown in FIG. 10, the magnetic disk apparatus 110B includes a ramp 13A located in the vicinity of the magnetic disk 5. The ramp 13A has a guide 13B inclined in the direction toward the central portion of the magnetic disk 5.

As shown in FIGS. 10 and 11, the unloading arm 12 is provided on a bottom surface of the flexure member supporting arm 2. The unloading arm 12 includes an attaching section 12C to be secured to the flexure member supporting arm 2, an arm engaging section 12B to be slidably in contact with the ramp 13A at an unloading position or in the vicinity thereof, and a central section 12A to be in engagement with an engaging section 211B of a load beam 211 when the head actuator arm 111 pivots in the direction of arrow QQ so as to release the slider 8 from the load of the load beam 211. The unloading arm 12 has a cantilever structure, by which the unloading arm 12 is secured to the flexure member supporting arm 2 at the attaching section 12C.

With reference to FIGS. 12, 13A through 13D, 14A and 14B, an exemplary operation of the magnetic disk apparatus 110B in the fourth example will be described.

Figure 12:
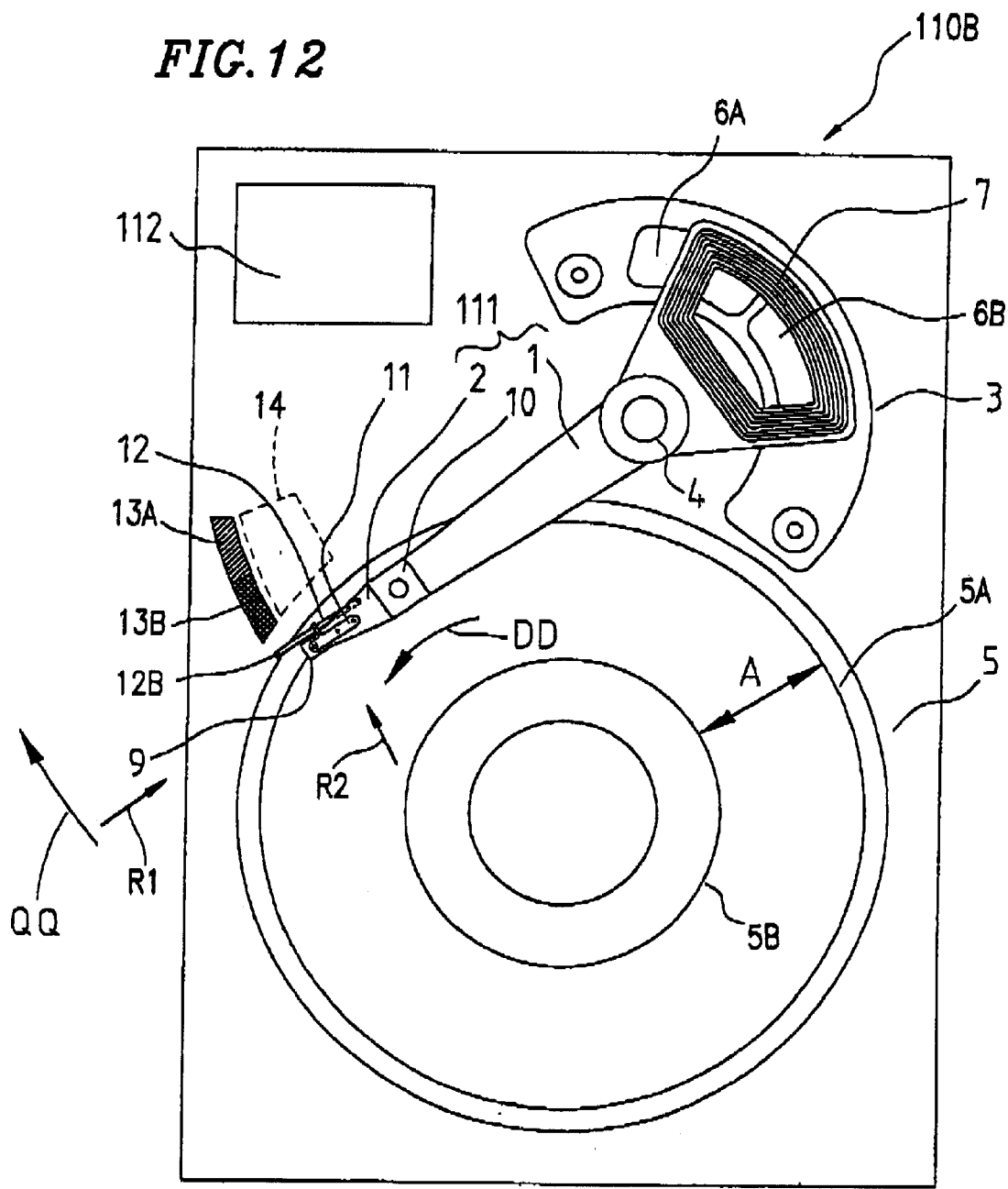
FIG. 12 is a plan view of a magnetic disk apparatus shown in FIG. 10, illustrating the state where the magnetic disk apparatus is in an operation mode.
Figure 13A:
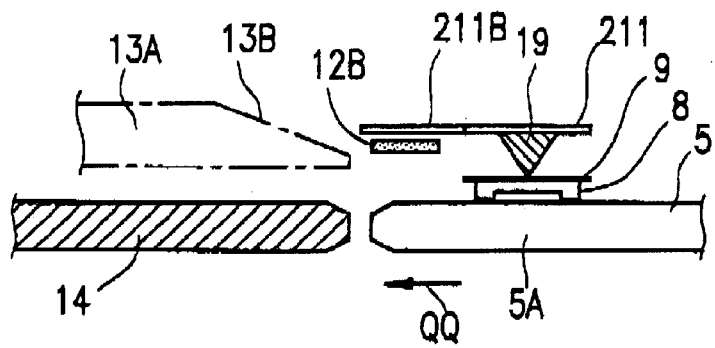
FIGS. 13A through 13D are aide view of the slider end the elements in the vicinity thereof of the magnetic disk apparatus shown in FIG. 10 seen in the direction of R1 in FIG. 10, illustrating the transfer of the magnetic disk apparatus from the operation mode to the stop mode.
Figure 13B:
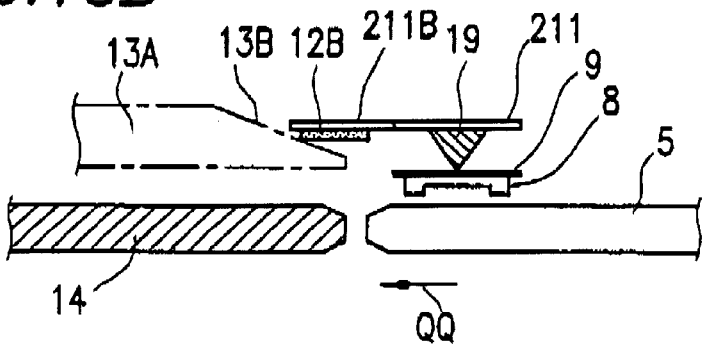
Figure 13C:
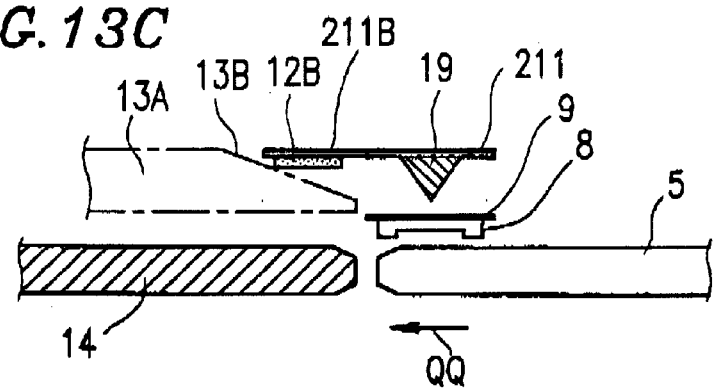
Figure 13D:
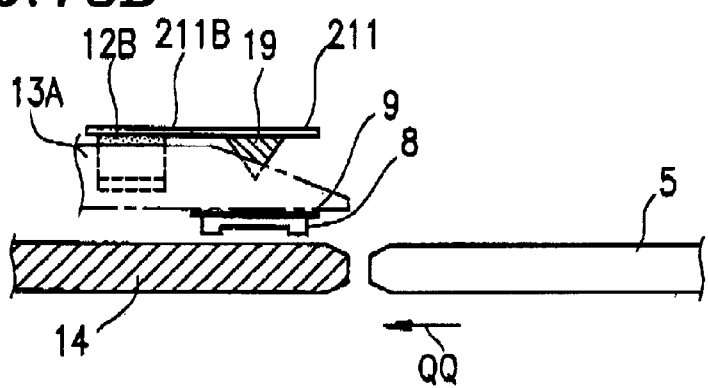

FIG. 12 is a plan view of the magnetic disk apparatus 110B. In the state of FIG. 12, the magnetic disk apparatus 110B is in an operation mode; i.e., the slider 8 (FIG. 11) is in a loaded state. FIGS. 13A through 13D are partial side views of the head actuator arm 111 seen in the direction of arrow R1 (FIG. 12). In the state of FIG. 13A, the magnetic disk apparatus 110B is in the operation mode. In this state, the slider 8 is above the outermost track 5A of the magnetic disk 5, in a manner that information can be recorded on or reproduced from the magnetic disk 5 which is rotating at a prescribed speed. In the state of FIGS. 13B and 13C, the magnetic disk apparatus 110B is going into a stop mode; i.e., the slider 8 is going into an unloaded state. In the state of FIG. 13D, the magnetic disk apparatus 110B is in the stop mode.

So that the magnetic disk apparatus 110B goes into the stop mode from the state shown in FIGS. 12 and 13A, the rotation speed of a spindle motor (not shown) is increased to a prescribed value by the magnetic disk control section 112. Then, the floating force of the air flow acting on the slider 8 is increased. As a result, the floating distance of the slider 8 above the magnetic disk 5 is increased.

Then, as shown in FIG. 13B, the head actuator arm 111 (FIG. 12) pivots clockwise, i.e., in the direction of arrow QQ, the arm engaging section 12B is engaged with the guide 13B of the ramp 13A. As the head actuator arm 111 further pivots, the arm engaging section 12B in engagement with the guide 13B slides up on the guide 13B to be raised. As the arm engaging section 12B is raised, the flexure member 9 is raised by its elastic force to recover its original shape while contacting the protrusion 19.

As shown in FIG. 13C, as the head actuator arm 111 further pivots clockwise, the arm engaging section 12B in engagement with the guide 13B is further raised by the guide 13B, and the flexure member 9 which has recovered its original shape is separated from the protrusion 19.

As shown in FIG. 13D, as the head actuator arm 111 further pivots clockwise, the arm engaging section 12B is further raised by the ramp 13A, and the slider 8 moves onto the slider receptor 14.

Figure 14A:
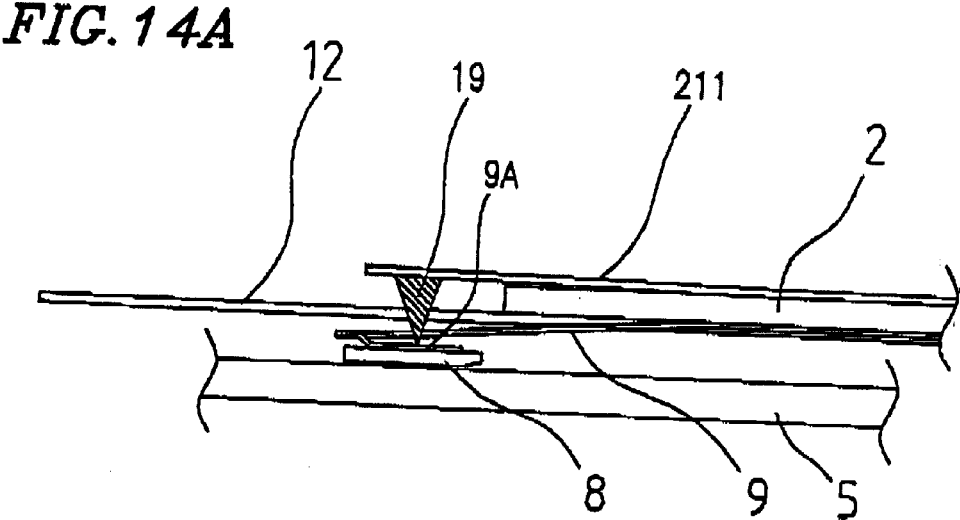
FIGS. 14A and 14B are side view of the slider and the elements in the vicinity thereof of the magnetic disk apparatus shown in FIG. 10 seen in the direction of R2 in FIG. 10, illustrating the transfer of the magnetic disk apparatus from the operation mode to the stop mode.
Figure 14B:
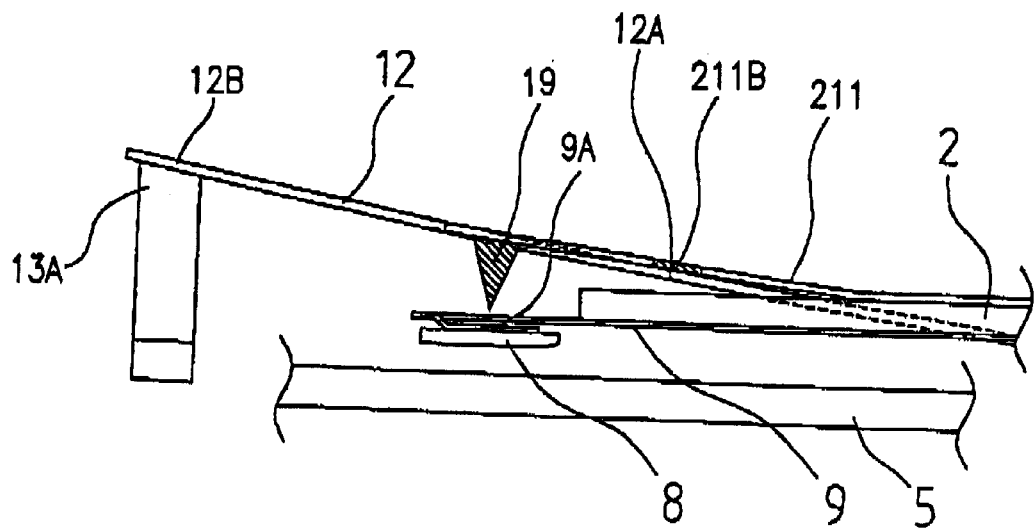

FIGS. 14A and 14B are partial side views of the head arm actuator 111 seen in the direction of arrow R2 (FIG. 12). FIG. 14A shows the same state as in FIG. 13A, and FIG. 14B shows the same state as in FIG. 13D.

As shown in FIG. 14A, the slider 8 is supplied with a prescribed load of, for example, about 1 gram to 3 grams by the protrusion 19 on the load beam 211 via the slider attaching section 9A of the flexure member 9. The load is now being reduced as the magnetic head is more and more reduced in size by the improving recording density of the magnetic disks.

The slider 8 is maintained stable when the load and the pressure of the air flow generated by the rotation of the magnetic disk 5 are balanced. The flexure member 9 is bent due to the load of the load beam 211. Accordingly, to be more strict, the slider 8 is maintained stable in the state where a value obtained by subtracting the load for bending the flexure member 9 from the load of the load beam 211 is balanced with the pressure of the air flow. The floating distance of the slider 8 above the magnetic disk 5 is, for example, about 50 nm.

When the magnetic disk apparatus 110B goes into the state shown in FIG. 13D by the pivoting of the head actuator arm 111 in the direction of arrow QQ, the arm engaging section 12B is raised by the ramp 13A. Then, the unloading arm 12 raises the load beam 211. Then, the slider 8 is released from the load of the load beam 211 and lifted up from the magnetic disk 5 by a small recovery force of the flexure member 9 to return the flexure member 9 to a horizontal state.

As described above, while the magnetic disk 5 is in an operation mode, a prescribed load is applied to the flexure member 9; and when the magnetic disk apparatus 110B stops operating, the flexure member 9 is released from the load by the ramp 13A and the unloading arm 12, and the slider 8 is lifted up from the magnetic disk 5 by the elasticity of the flexure member 9. As described above, the ramp 13A releases the slider 8 above the outermost track of the magnetic disk 5 from the load.

In the fourth example, the slider 8 is held by the flexure member supporting arm 2 via the flexure member 9, and the load beam 211 and the unloading arm 12 are also held by the flexure member supporting arm 2. Due to such a structure, even when the contact between the arm engaging section 12B and the ramp 13A causes a friction or even when the position of the arm engaging section 12B acted on by the ramp 13A is dispersed while the arm engaging section 12B in engagement with the load beam 211 is being raised by the ramp 13A, the slider 8 and the magnetic disk 5 are maintained parallel. As a result, the contact friction between the slider 8 and the magnetic disk 5 is prevented when the slider 8 is lifted up from the magnetic disk 5.

Since the flexure member 9 is held by the flexure member supporting arm 2, the flexure member 9 does not integrally vibrate with the load beam 211 even when the load beam 211 resonates by vibration of the magnetic disk apparatus caused by an external disturbance.

Since the unloading arm 12 is provided separately from the load beam 211, the load beam 211 and the flexure member 9 can be reduced in size. Accordingly, the resonating frequency of the leaf spring used for the load beam 211 or the flexure member 9 can be as high as possible. In consequence, the tracking control characteristics of the magnetic head can be significantly improved.

Due to the structure in which the unloading arm 12 is provided separately from the load beam 211 and located on a side of the load beam 211 opposite from the magnetic disk 5, the ramp 13A is distanced from the magnetic disk 5 by distance D1, without overlapping the magnetic disk 5, as shown in FIG. 10.

Since the ramp 13A is distanced from the magnetic disk 5, the ramp 13A can have a simple shape. Accordingly, the inconveniences such as, for example, undesirable contacts between the ramp 13A and the magnetic disk 5 caused by the dispersion in the production and assembly precision of the magnetic disk apparatus 110B and the error in the relative arrangement of the magnetic disk 5 and the ramp 13A are avoided. As a result, the magnetic disk apparatus 110B is suitable for mass production.

In the first through fourth examples, the flexure member supporting arm 2 and the arm 1 are separate from each other. Alternatively, the flexure member supporting arm 2 and the arm 1 can be integral with each other, in which case the production cost of the magnetic disk apparatus 110B is reduced. The flexure member supporting arm 2 and the unloading arm 12 are separate from each other in the above examples. Alternatively, the flexure member supporting arm 2 and the unloading arm 12 can be integral with each other, in which case the production cost of the magnetic disk apparatus 110B is reduced.

EXAMPLE 5

A magnetic disk apparatus in a fifth example according to the present invention will be described. Identical elements previously discussed with respect to FIGS. 1 through 14B bear identical reference numerals and the descriptions thereof will be omitted.

Figure 15A:
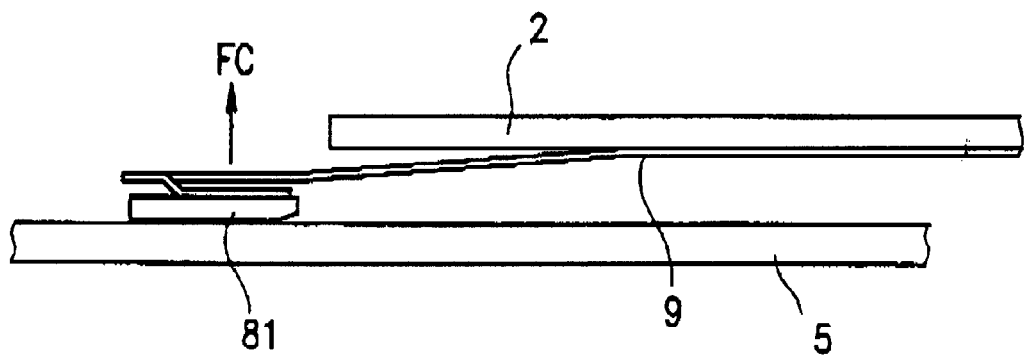
FIGS. 15A and 15B are side view of the slider and the elements in the vicinity thereof of a magnetic disk apparatus in a fifth example according to the present invention, seen in the direction of R2 in FIG. 10, illustrating the transfer of the magnetic disk apparatus from the operation mode to the stop mode.
Figure 15B:
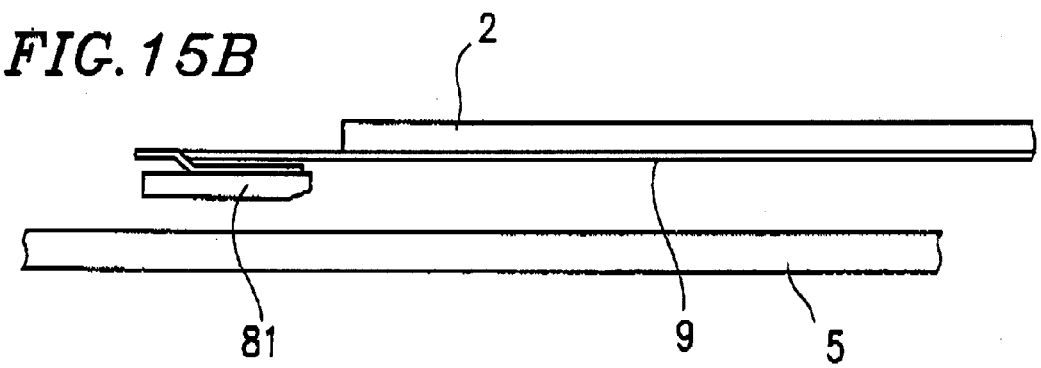

FIGS. 15A and 15B are partial side views of a slider 81 and the vicinity thereof of the magnetic disk apparatus in the fifth example. FIGS. 15A and 15B are views seen in the direction of arrow R2 (e.g., FIG. 12). In the state of FIG. 15A, the slider 81 is above the outermost track of the magnetic disk 5 in a manner that information recording and reproduction are possible. In the state of FIG. 15B, when the slider 81 is away from the magnetic disk 5.

Figure 16:
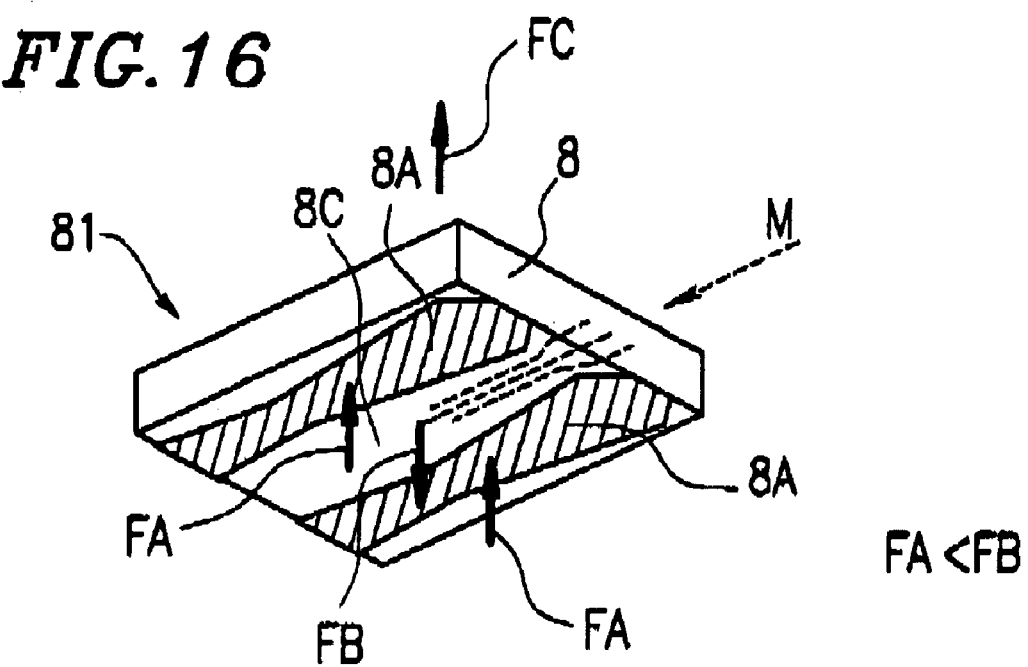
FIG. 16 is an enlarged isometric view of the slider shown in FIGS. 15A and 15B.

FIG. 16 is an isometric view of the slider 81, illustrating an air bearing surface of the slider 81 which faces the surface of the magnetic disk 5 (FIGS. 15A and 15B). Referring to FIG. 16, the slider 81 has projections 8A and a recess 8C. The projections 8A projects relative to the recess 8C by a height difference in the order of several micrometers. The surface of the recesses 8C acts as an air bearing surface. When the slider 81 runs over the surface of the magnetic disk 5 (FIGS. 15A and 15B), the air flows on the air bearing surface in the direction of arrow M.

A positive pressure FA acts on the projections 8A in a direction to separate the slider 81 from the magnetic disk 5 (FIGS. 15A and 15B). A negative pressure FB acts on the recess 8C in the opposite direction. The projections 8A and the recess 8C are formed so that the negative pressure FB is larger than the positive pressure FA (FA<FB). In other words, the height difference between the projections 8A and the recess 8C in FIG. 16 is larger than the height difference between the projections 8A and the recess 8B in FIG. 3B.

In the state shown in FIG. 15A, the flexure member 9 is bent. Accordingly, the slider 81 is supplied with an elastic force FC acting in the positive direction as shown in FIG. 16 (force to return the flexure member 9 to its original position).

An exemplary operation of the magnetic disk apparatus having the above-described structure will be described.

When the magnetic disk apparatus is switched to an operation mode from the state of FIG. 15B, the magnetic disk 5 rotates by the magnetic disk control section 112. The rotation speed of the magnetic disk 5 increases and reaches a second rotation speed N2, which is higher than a first rotation speed N1 used for recording and reproduction. Then, the rotation speed of the magnetic disk 5 is gradually decreased down to the first rotation speed N1 and is maintained at the first rotation speed N1 thereafter.

Figure 17:
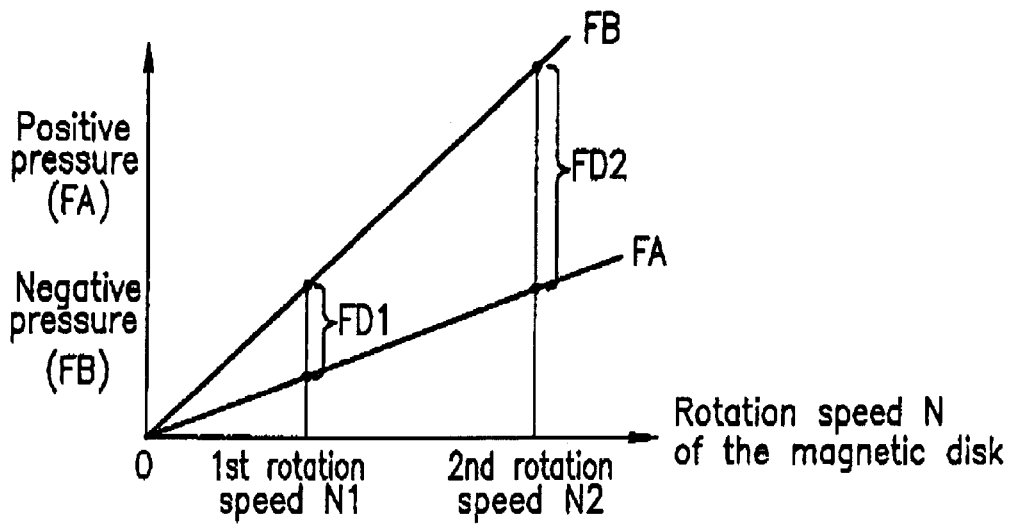
FIG. 17 is a graph illustrating the dependency of a positive pressure and a negative pressure on a rotation speed of the magnetic disk in the fifth example.

FIG. 17 is a graph illustrating the dependency of the positive pressure FA and the negative pressure FB on the rotation speed of the magnetic disk 5 (FIGS. 15A and 15B). The horizontal axis represents the rotation speed N of the magnetic disk 5, and the vertical axis represents the positive pressure FA and the negative pressure FB. A pressure difference FD1 obtained by subtracting the positive pressure FA from the negative pressure FB at the first rotation speed N1 is equal to the elastic force FC generated by the flexure member 9 shown in FIGS. 15A and 16 acting on the slider 81. The slider 81 floats above the magnetic disk 5 at a microscopic floating distance by the balance between the elastic force FC and the pressure difference FD1 caused by the air flow.

Figure 18E:
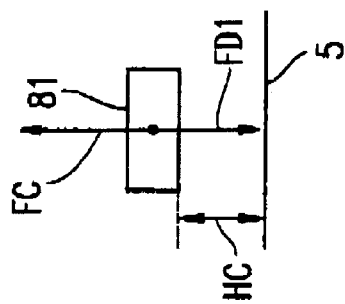
Figure 18D:
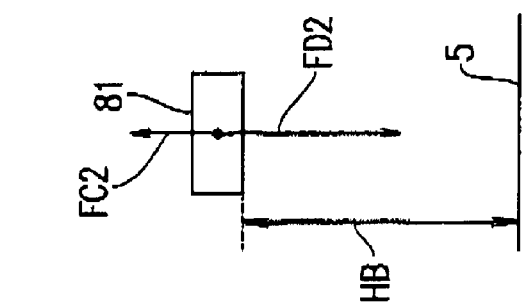
Figure 18C:
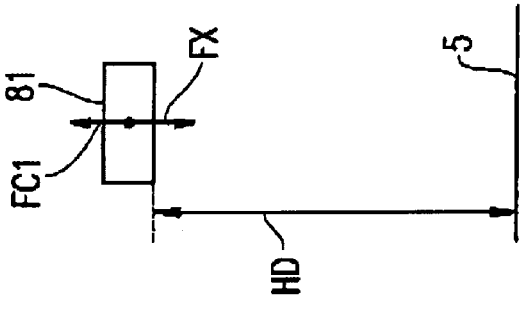
Figure 19:
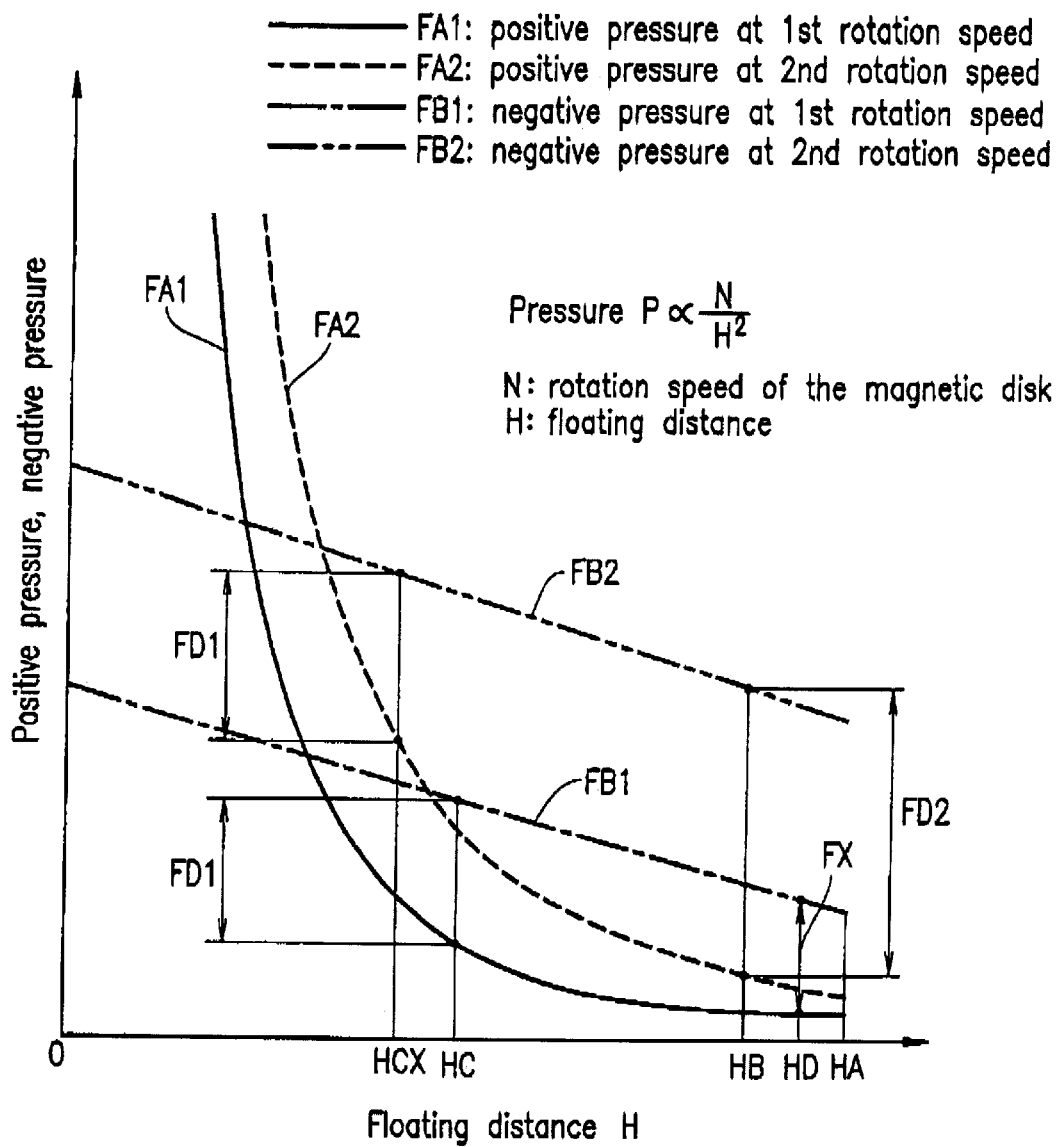
FIG. 19 is a graph illustrating the relationship between the floating distance and the positive and negative pressures in the fifth exemplar.
Figure 20:
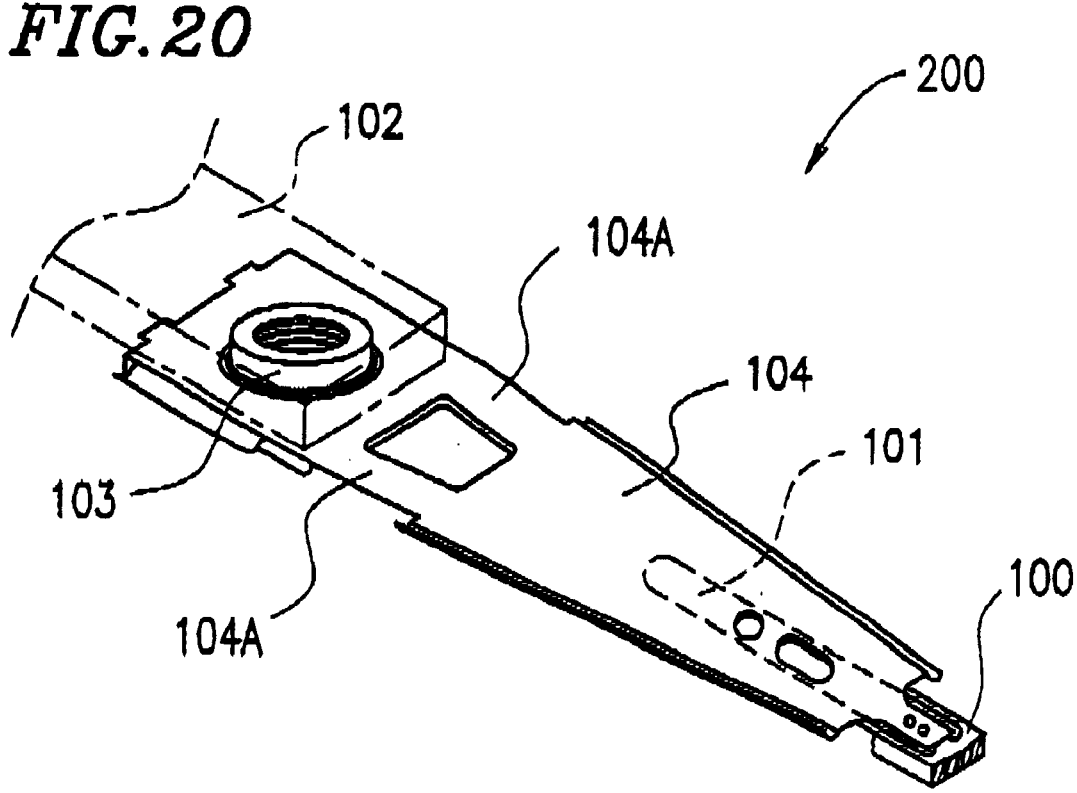
FIG. 20 is an isometric view illustrating a structure of a slider holding section of a conventional magnetic disk apparatus.

In FIGS. 17 and 19, "FD1" represents the pressure difference between the positive pressure FA and the negative pressure FB at the first rotation speed N1, and "FD2" represents the pressure difference between the positive pressure FA and the negative pressure FB at the second rotation speed N2. In FIGS. 18C, 18D, 18E and 18F, "FC1" represents the elastic force generated by the flexure member 9 at the first rotation speed N1, and "FC2" represents the elastic force generated by the flexure member 9 at the second rotation speed N2.

As can be appreciated from FIG. 17, the pressure difference FD2 at the second rotation speed N2 is larger than the pressure difference FD1 at the first rotation speed N1. The pressure difference FD2 attracts the slider 81 (FIGS. 15A and 15B) in the direction of approaching the magnetic disk 5.

Figure 18A:
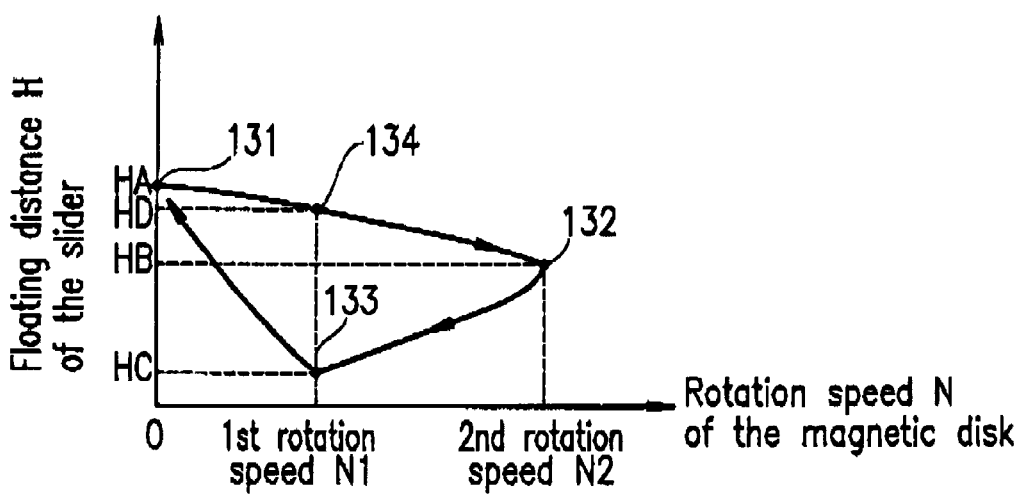
FIG. 18A is a graph illustrating the floating distance of the slider in accordance with the rotation speed of the magnetic disk in the fifth example.
Figure 18F:
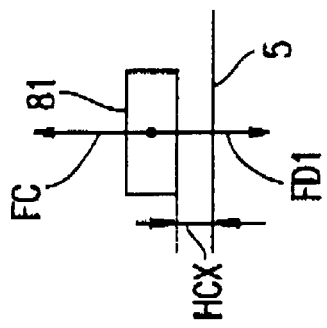
FIGS. 18B through 18F are diagrams illustrating the relationship among the floating distance of the slider, the pressure difference acting on the slider, and the elastic force generated by a flexure member in the fifth example.

FIG. 18A is a graph illustrating the floating distance H of the slider 81 changing in accordance with the rotation speed N of the magnetic disk 5. The horizontal axis represents the rotation speed N, and the vertical axis represents the floating distance H. FIGS. 18B through 18F are diagrams illustrating the relationship among the floating distance H of the slider 81, the pressure difference acting on the slider 81, and the elastic force generated by the flexure member 9.

Figure 18B:
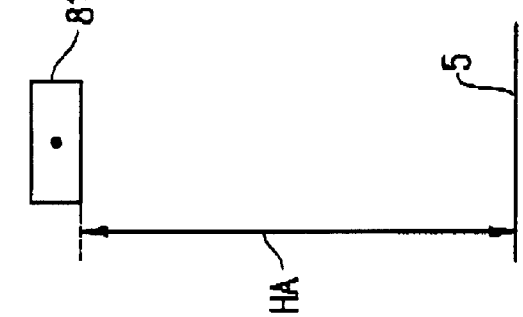

Referring to FIG. 18A, point 131 shows that the floating distance is HA when the magnetic disk apparatus is in a stop mode (FIG. 18B). When the magnetic disk apparatus is started, the magnetic disk 5 starts rotating. Point 134 shows that when the rotation speed of the magnetic disk 5 reaches the first rotation speed N1, the floating distance is HD (FIG. 18C). Point 132 shows that when the rotation speed of the magnetic disk 5 reaches the second rotation speed N2, the floating distance is HB (FIG. 18D). Point 133 shows that when the rotation speed of the magnetic disk 5 decreases to the first rotation speed N1, the floating distance is HC (FIG. 18E).

Such a series of changes in the floating distance H shown in FIG. 18A will be described with reference to FIGS. 18A through 18F and 19. FIG. 19 is a graph illustrating the relationship between the floating distance H and the positive and negative pressures FA and FB. The horizontal axis represents the floating distance H, and the vertical axis represents the positive pressure FA and the negative pressure FB.

In FIG. 19, curve FA1 represents the relationship between the floating distance H and the positive pressure FA at the first rotation speed N1. Curve FB1 represents the relationship between the floating distance H and the negative pressure FB at the first rotation speed N1. Curve FA2 represents the relationship between the floating distance H and the positive pressure FA at the second rotation speed N2. Curve FB2 represents the relationship between the floating distance H and the negative pressure FB at the second rotation speed N2. The positive pressure FA is in inverse proportion to the square of the floating distance H. The positive pressure FA tends to increase in proportion to the rotation speed N.

With reference to FIGS. 18A through 18F and 19, the transfer of the magnetic disk apparatus from the stop mode to the operation mode will be described.

As shown by point 131 in FIG. 18A and FIG. 18B, when the magnetic disk apparatus in the stop mode, the slider 81 and the magnetic disk 5 are distanced from each other by the floating distance HA. As shown by point 134 in FIG. 18A and FIG. 18C, when the rotation speed of the magnetic disk 5 reaches the first rotation speed N1, the floating distance is reduced from HA to HD. As shown in FIGS. 18C and 19, when the floating distance is HD, a pressure difference FX between the positive pressure FA and the negative pressure FB is generated.

As shown in FIGS. 18C, 18E and 19, the pressure difference FX is smaller than the pressure difference FD1 at the first rotation speed N1. Therefore, the slider 81 does not approach as close to the magnetic disk 5 as to have a floating distance of HC (FIG. 18E).

As shown by point 132 in FIG. 18A and FIG. 18D, when the rotation speed N of the magnetic disk 5 is raised to the second rotation speed N2, the floating distance is further reduced from HD to HB. As shown in FIGS. 18D and 19, when the floating distance is HB, a pressure difference FD2 between the positive pressure FA and the negative pressure FB is generated.

The pressure difference FD2 is sufficiently larger than the pressure difference FD1. As described above, the pressure difference FD1 is equal to the elastic force FC. The elastic force FC2 is smaller than the elastic force FC. Therefore, the pressure difference FD2 is sufficiently larger than the elastic force FC2. Accordingly, when the rotation speed N2 of the magnetic disk 5 is maintained, the floating distance of the slider 81 is reduced to HCX, at which the pressure difference at the second rotation speed N2 between the positive and negative pressures FA and FB becomes as small as FD1. Since the floating distance HCX is smaller than the prescribed floating distance HC, the slider 81 and the magnetic disk 5 may undesirably contact each other.

In the fifth example, as shown in FIGS. 18A, 18D and 19, the rotation speed N of the magnetic disk 5 is gradually decreased from the second rotation speed N2 to the first rotation speed N1. When the magnetic disk 5 is rotated constantly at the first rotation speed N1, the floating distance of the slider 81 at the first rotation speed N1 becomes the prescribed floating distance HC, at which the pressure difference between the positive and negative pressured FA and FB is FD1.

In the fifth example, the air bearing surface of the slider 81 is shaped as prescribed, the flexure member 9 for holding the slider 81 is provided with an elastic force, and the rotation speed of the magnetic disk 5 is controlled. By such a simple operation, the floating distance of the slider 81 above the magnetic disk 5 is adjusted to be and stably maintained at the prescribed floating distance HC. Thus, the magnetic disk apparatus is significantly simplified and the reliability of the apparatus is significantly improved.

A plurality of magnetic disks 5 are stacked in the magnetic disk apparatus. In the above examples, the elements such as, for example, the sliders 8 and 81 are described as being located on one side of the magnetic disks 5 for simplicity. The present invention is not limited to such a structure. The elements may be provided on both of two sides of the magnetic disks 5.

As described above, the present invention provides a magnetic disk apparatus for maintaining a slider and a magnetic disk substantially parallel with an appropriate floating distance therebetween so as to prevent damaging the slider and the magnetic disk, so that information is correctly recorded on or reproduced from the magnetic disk.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic disk apparatus, comprising:
   a slider for holding a magnetic head for scanning a magnetic disk and performing recording and reproduction of information;
   a flexure member for holding the slider, the flexure member having an elasticity in a direction substantially perpendicular to a surface of the magnetic disk;
   a head actuator arm for holding the flexure member and causing the magnetic head to scan the magnetic disk;
   an elastic body provided on the head actuator arm for applying a load for pressing the slider toward the surface of the magnetic disk; and
   unloading means for releasing the slider from the load.

2. A magnetic disk apparatus according to claim 1, wherein the elastic body includes a leaf spring, and the leaf spring has a cantilever structure.

3. A magnetic disk apparatus according to claim 1, wherein the unloading means releases the slider from the load when the slider is positioned above an outermost track of the magnetic disk.

4. A magnetic disk apparatus according to claim 1, wherein the unloading means includes a ramp slidably contactable with the elastic body so as to raise the elastic body from the flexure member.

5. A magnetic disk apparatus according to claim 4, wherein the elastic body includes an engaging section slidably contactable with the ramp.

6. A magnetic disk apparatus according to claim 1, wherein the unloading means includes a shape-memory alloy member provided on the elastic body for bending the elastic body so as to release the slider from the load.

7. A magnetic disk apparatus according to claim 1, wherein the unloading means includes a thin film piezoelectric member provided on the elastic body for bending the elastic body so as to release the slider from the load.

8. A magnetic disk apparatus according to claim 1, wherein the unloading means includes:
   an unloading arm secured to the head actuator arm; and
   a ramp slidably contactable with the unloading arm so as to allow the unloading arm to release the slider from the load,
   wherein the unloading arm releases the slider from the load so as to allow the slider top be maintained substantially parallel to the surface of the magnetic disk.

9. A magnetic disk apparatus according to claim 8, wherein the unloading arm is engageable with the elastic body so as to release the slider from the load.

10. A magnetic disk apparatus according to claim 8, wherein the unloading arm has one end secured to the head actuator arm, another end slidably contactable with the ramp in an area including an unloading position and the vicinity thereof, and a central portion engageable with the elastic body so as to release the slider from the load.

11. A magnetic disk apparatus according to claim 8, wherein the ramp includes a guide having an inclined surface which is slidably contactable with the unloading arm, and the inclined surface is inclined toward a central portion of the magnetic disk.

12. A magnetic disk apparatus according to claim 8, wherein the unloading arm includes a leaf spring, and the leaf spring has a cantilever structure.

13. A magnetic disk apparatus according to claim 8, wherein the ramp is located so as to avoid overlapping the surface of the magnetic disk.

14. A magnetic disk apparatus according to claim 8, wherein the unloading arm is substantially parallel to a longitudinal direction of the head actuator arm.

15. A magnetic disk apparatus according to claim 8, wherein the unloading arm is located on a side of the elastic body opposite from the magnetic disk.

16. A magnetic disk apparatus according to claim 8, wherein the elastic body has an engaging section which is engageable with the unloading arm so as to release the slider from the load.

17. A magnetic disk apparatus according to claim 1, wherein the elastic body is provided with a protrusion for pressing the flexure member with the load.

18. A magnetic disk apparatus according to claim 1, wherein the flexure member is provided with a protrusion for receiving the load.

* * * * *